United States Patent
Oshida

(10) Patent No.: US 9,667,410 B2
(45) Date of Patent: May 30, 2017

(54) SEMICONDUCTOR DEVICE

(71) Applicant: Renesas Electronics Corporation, Tokyo (JP)

(72) Inventor: Daisuke Oshida, Tokyo (JP)

(73) Assignee: Renesas Electronics Corporation, Koutou-ku, Tokyo (JP)

(*) Notice: Subject to any disclaimer, the term of this patent is extended or adjusted under 35 U.S.C. 154(b) by 84 days.

(21) Appl. No.: 14/844,175

(22) Filed: Sep. 3, 2015

(65) Prior Publication Data

US 2016/0072621 A1    Mar. 10, 2016

(30) Foreign Application Priority Data

Sep. 5, 2014  (JP) ................................. 2014-181211

(51) Int. Cl.
*H04L 29/06* (2006.01)
*H04L 9/00* (2006.01)
*G06F 21/72* (2013.01)
*G06F 21/55* (2013.01)
*G06F 21/71* (2013.01)
*G09C 1/00* (2006.01)
*H04L 9/06* (2006.01)

(52) U.S. Cl.
CPC ............ *H04L 9/002* (2013.01); *G06F 21/554* (2013.01); *G06F 21/71* (2013.01); *G06F 21/72* (2013.01); *G09C 1/00* (2013.01); *H04L 9/003* (2013.01); *H04L 9/0631* (2013.01); *H04L 2209/122* (2013.01); *H04L 2209/125* (2013.01); *H04L 2209/46* (2013.01)

(58) Field of Classification Search
CPC ....... H04L 9/002; H04L 9/003; H04L 9/0631; G06F 21/71; G06F 71/72; G09C 1/00

USPC .......................................................... 713/194
See application file for complete search history.

(56) References Cited

U.S. PATENT DOCUMENTS 6,998,721 B2 * 2/2006 Zhou .................... G06K 9/0002
                                                      257/679
7,389,937 B2    6/2008 Ito
8,327,158 B2 * 12/2012 Titiano .................. G06F 1/3203
                                                      713/300
(Continued)

FOREIGN PATENT DOCUMENTS

| JP | 2000-003427 A | 1/2000 |
| JP | 2006-172122 A | 6/2006 |
| JP | 2007-234001 A | 9/2007 |

*Primary Examiner* — Michael S McNally
(74) *Attorney, Agent, or Firm* — Sughrue Mion, PLLC

(57) ABSTRACT

In data processing including high-speed cipher calculation for which it is not appropriate to employ a leveling technique, tamper resistance is improved against an attack to a specific position performed by knowing a layout of functional blocks in a semiconductor chip. Examples of the attack include micro-probing, fault injection, and electromagnetic wave analysis.

A semiconductor device, in which a plurality of IC chips that perform the same cipher calculation in parallel are laminated or stacked, performs data processing including the cipher calculation. A chip that compares and verifies results of the cipher calculations performed by the plurality of chips is laminated in an intermediate layer whose element surface is covered by another chip. For example, when three chips are laminated, a chip in the intermediate layer sandwiched by the upper layer and the lower layer has a comparative verification function.

19 Claims, 14 Drawing Sheets

(56) References Cited

U.S. PATENT DOCUMENTS

| | | | |
|---|---|---|---|
| 2002/0094088 A1* | 7/2002 | Okaue | G11B 20/00086 |
| | | | 380/278 |
| 2006/0136755 A1* | 6/2006 | Qawami | G06F 1/3203 |
| | | | 713/300 |
| 2007/0180285 A1 | 8/2007 | Dembo | |
| 2010/0125915 A1* | 5/2010 | Hall | G06F 21/85 |
| | | | 726/26 |
| 2015/0349969 A1* | 12/2015 | Dworak | H04L 9/3278 |
| | | | 380/28 |

* cited by examiner

FIG. 5

| | Chip_A | Chip_B | Chip_C | PROCESSING |
|---|---|---|---|---|
| SECURITY FOCUSED TYPE | SAME | SAME | SAME | ASSUME NORMAL PROCESSING AND PERFORM NEXT PROCESSING |
| | DIFFERENT | SAME | SAME | DETERMINE THAT THERE IS AN ATTACK, AND INTERRUPT PROCESSING/REPORT ABNORMAL END |
| | SAME | SAME | DIFFERENT | DETERMINE THAT THERE IS AN ATTACK, AND INTERRUPT PROCESSING/REPORT ABNORMAL END |
| | SAME | DIFFERENT | SAME | PERFORM REPROCESSING WHEN RESULTS BEFORE AND AFTER ARE THE SAME AND DIFFERENT FROM THOSE OF OTHER Chips, IT IS DETERMINED THAT THERE IS A FAILURE, AND FAILURE IS REPORTED WHEN RESULTS BEFORE AND AFTER ARE DIFFERENT, IT IS DETERMINED THAT THERE IS AN ATTACK, AND ABNORMAL END IS REPORTED |
| | SAME | SAME | SAME | ASSUME NORMAL PROCESSING AND PERFORM NEXT PROCESSING |
| | DIFFERENT | SAME | SAME | ONLY Chip_A PERFORMS PROCESSING AGAIN WHEN RESULTS BEFORE AND AFTER ARE THE SAME AND DIFFERENT FROM THOSE OF OTHER Chips, IT IS DETERMINED THAT THERE IS A FAILURE, AND FAILURE IS REPORTED WHEN RESULTS BEFORE AND AFTER ARE DIFFERENT, IT IS DETERMINED THAT THERE IS AN ATTACK, AND ABNORMAL END IS REPORTED |
| FUNCTION FOCUSED TYPE | SAME | SAME | DIFFERENT | ONLY Chip_C PERFORMS PROCESSING AGAIN WHEN RESULTS BEFORE AND AFTER ARE THE SAME AND DIFFERENT FROM THOSE OF OTHER Chips, IT IS DETERMINED THAT THERE IS A FAILURE, AND FAILURE IS REPORTED WHEN RESULTS BEFORE AND AFTER ARE DIFFERENT, IT IS DETERMINED THAT THERE IS AN ATTACK, AND ABNORMAL END IS REPORTED |
| | SAME | DIFFERENT | SAME | ONLY Chip_B PERFORMS PROCESSING AGAIN WHEN RESULTS BEFORE AND AFTER ARE THE SAME AND DIFFERENT FROM THOSE OF OTHER Chips, IT IS DETERMINED THAT THERE IS A FAILURE, AND FAILURE IS REPORTED WHEN RESULTS BEFORE AND AFTER ARE DIFFERENT, IT IS DETERMINED THAT THERE IS AN ATTACK, AND ABNORMAL END IS REPORTED |

SEMICONDUCTOR DEVICE

CROSS-REFERENCE TO RELATED APPLICATIONS

The disclosure of Japanese Patent Application No. 2014-181211 filed on Sep. 5, 2014 including the specification, drawings and abstract is incorporated herein by reference in its entirety.

BACKGROUND

The present invention relates to a semiconductor device and, in particular, the present invention can be preferably used for a semiconductor device in which a plurality of IC chips are laminated or stacked and which has tamper resistance.

Advance in semiconductor process is accompanied by advance in analysis technology. Owing to the advance in analysis technology, things that have not been able to be seen can be seen and subtle signals that have not been able to be detected can be analyzed, so that it is possible to improve performance and the like. On the other hand, the advance in analysis technology significantly affects development of security technology. There is a so-called side channel attack which analyzes a subtle electromagnetic wave leaked from an LSI (Large Scale Integrated circuit) device and finds out an encryption key. Further, the attack develops to various attacks such as an invasive attack which processes an LSI by FIB (Focused Ion Beam) or the like and reads data flowing through signal wiring in the LSI by micro-probing and a fault injection attack which irradiates an LSI with laser or the like to inject a fault in the LSI and analyzes error data obtained from the fault. Assets possessed by an electronic device include many things such as credit card information, and the degree of importance thereof is increasing, so that it is necessary to improve a mechanism for safeguarding such information, that is, to improve security level (tamper resistance).

Japanese Unexamined Patent Application Publication No. 2007-234001 discloses a semiconductor device which further complicates temporal changes in physical information leaked from an IC (Integrated Circuit) chip by adding a random number generator and an auxiliary arithmetic unit in order to make it difficult to retrieve a secret key from an intercepted power change and electromagnetic irradiation in a power analysis attack and an electromagnetic wave analysis attack.

Japanese Unexamined Patent Application Publication No. 2000-3427 discloses an IC card formed by laminating two IC chips so that their element surfaces face each other in order to prevent information stored in a memory in an integrated circuit from being read by a third party.

Japanese Unexamined Patent Application Publication No. 2006-172122 discloses an IC card in which an IC card function chip that processes security data is laminated at a position other than a lowest layer of a substrate in order to prevent the chip from being broken by a stress.

SUMMARY

The inventors studied the Japanese Unexamined Patent Application Publications No. 2007-234001, No. 2000-3427, and No. 2006-172122, and found that there were new problems as described below.

It is possible to improve security level (tamper resistance) against the power analysis attack and the electromagnetic wave analysis attack by leveling the power consumption and the amount of electromagnetic radiation so that the power consumption and the amount of electromagnetic radiation do not vary depending on a value of secret key. For example, in the semiconductor device disclosed in Japanese Unexamined Patent Application Publication No. 2007-234001, it is understood that the power consumption and the amount of electromagnetic radiation are leveled by adding the random number generator and the auxiliary arithmetic unit. However, essentially unnecessary processing is added for the leveling, so that it is found that the leveling is not suited to, for example, high-speed cipher processing required in a vehicle. On the other hand, the cipher processing in a vehicle is involved with safety, so that strong tamper resistance is required. Therefore, it is found that the tamper resistance is required not only against simple power analysis attack and electromagnetic wave analysis attack, but also against an attack that performs fault injection that injects a fault into a specific position and an attack using electromagnetic wave analysis that observes electromagnetic radiation from a specific position, which are performed by knowing a layout of functional blocks in a semiconductor chip. The IC card described in Japanese Unexamined Patent Application Publication No. 2000-3427 is formed by IC chips laminated with their element surfaces facing each other, so that the problem that information in a non-volatile memory is read from the element surface is solved. However, countermeasures against the fault injection and the electromagnetic wave analysis by laser irradiation from a bottom surface are not considered. In the IC card described in Japanese Unexamined Patent Application Publication No. 2006-172122, an IC chip storing important data is laminated in a layer other than the lowest layer, so that it is possible to protect the IC chip from being broken by a stress. However, an element surface is exposed to an external surface, so that countermeasures against the micro-probing, the fault injection, the electromagnetic wave analysis, and the like are not considered.

It is found that, in data processing including high-speed cipher calculation for which it is not appropriate to employ a leveling technique, it is necessary to improve the tamper resistance against an attack to a specific position performed by knowing a layout of functional blocks in a semiconductor chip, such as, for example, an attack that performs fault injection that injects a fault into a specific position and an attack using electromagnetic wave analysis which observes electromagnetic radiation from a specific position.

While a means for solving the above problem will be described below, the other purposes and new features will become clear from the description of the present specification and the accompanying drawings.

According to an embodiment, the means for solving the above problem is as follows.

A semiconductor device, in which a plurality of IC chips that perform the same cipher calculation in parallel are laminated or stacked, performs data processing including the cipher calculation. An IC chip that compares and verifies results of the cipher calculations performed by the plurality of IC chips is laminated so that an element surface of the IC chip is covered by another IC chip.

A brief explanation of an effect obtained by the embodiment is as follows.

In data processing including high-speed cipher calculation for which it is not appropriate to employ a leveling technique, it is possible to improve tamper resistance against an attack to a specific position performed by knowing a layout of functional blocks in a semiconductor chip.

BRIEF DESCRIPTION OF THE DRAWINGS

FIG. 5 is an explanatory diagram of content of illegal attack handling processing.

DETAILED DESCRIPTION

1. Outline of Embodiments

Figure 1:
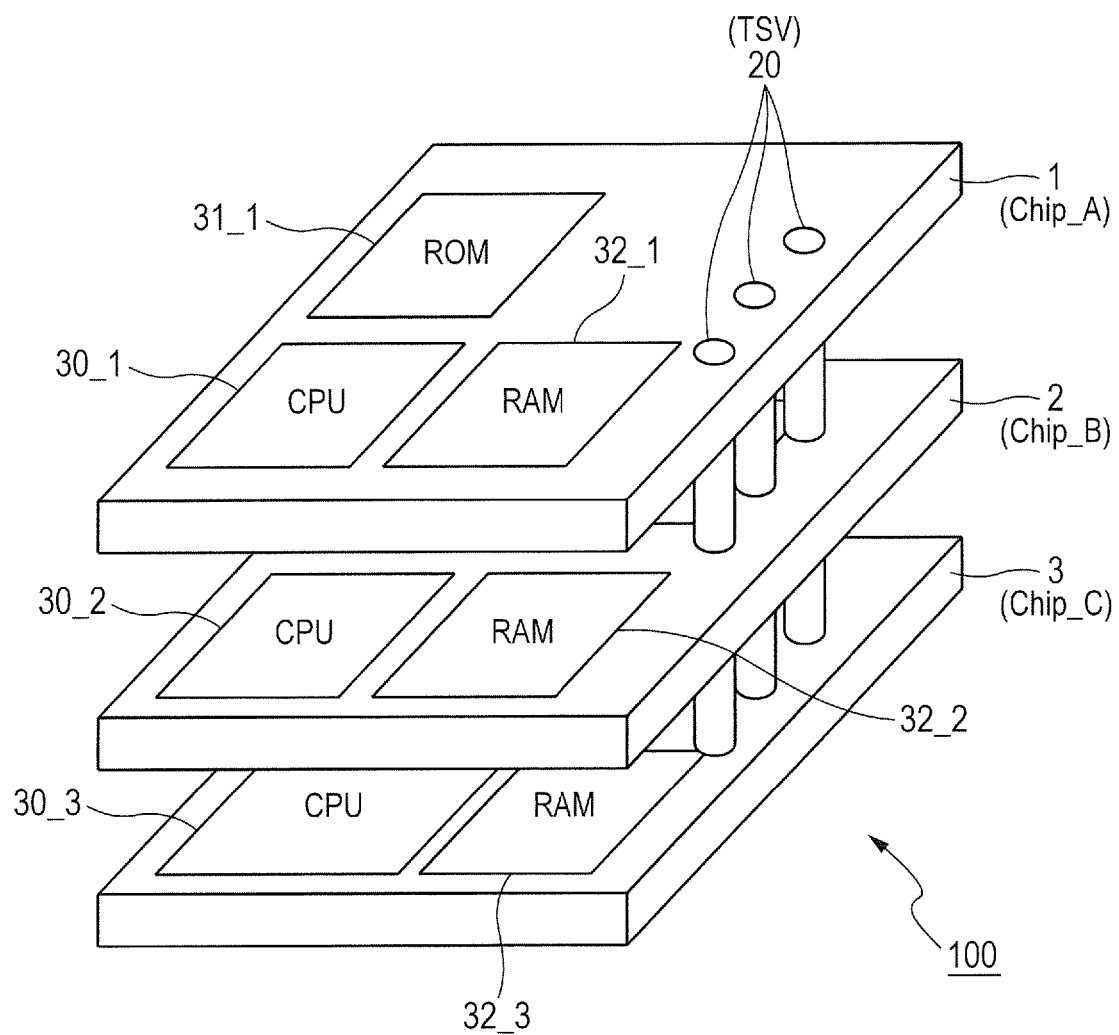
FIG. 1 is a schematic diagram showing a mounting example of a semiconductor device according to a first embodiment.

First, an outline of typical embodiments disclosed in the present application will be described. In the description of the outline of the typical embodiments, each reference symbol in the drawings, which is referred to in parentheses, only exemplifies a thing included in a concept of a component denoted by the reference symbol.

[1] Multiplexing & Comparative Verification Using Chip Whose Element Surface is Covered by Another Chip The typical embodiments disclosed in the present application are a semiconductor device (100) in which a plurality of IC chips (1 to 3; 4 to 6; 7_1 to 7_3) are laminated or stacked and which can perform data processing including cipher calculation. The semiconductor device (100) is configured as follows.

The IC chips perform the same cipher calculation (50_1 to 50_3) in parallel (S1) and calculate calculation results (51_1 to 51_3) respectively.

An element surface of one IC chip (2; 5; 7_2) of the aforementioned IC chips is covered by another IC chip, and the one IC chip compares the plurality of calculation results corresponding to the IC chips with each other (S2 and S3) and controls content of subsequent data processing (S4 and S5) based on the comparison results (53).

Thereby, in data processing including high-speed cipher calculation for which it is not appropriate to employ a leveling technique, it is possible to improve the tamper resistance against an attack to a specific position performed by knowing a layout of functional blocks in a semiconductor chip, such as, for example, the micro-probing, the fault injection by laser irradiation, and the electromagnetic wave analysis.

[2] Lamination in Which Both Surfaces of IC Chip that Performs Comparative Verification are Covered by Other Chips In paragraph [1], the aforementioned one IC chip (2, 5, or 7_2) is laminated or stacked so that the surface opposite to the element surface is further covered by another IC chip.

Thereby, in the IC chip that performs the comparative verification, the resistance against the fault injection from the bottom surface is improved.

[3] Corresponding Processing Where Security is Given the Highest Priority

In paragraph [2], when at least one calculation result of the plurality of calculation results is different from the other calculation results, the aforementioned one IC chip starts processing corresponding to an attack.

Thereby, processing where security is given the highest priority is performed.

[4] Corresponding Processing for Differentiating Between Failure and Attack

In paragraph [2], when at least one calculation result of the plurality of calculation results is different from the other calculation results, the aforementioned one IC chip causes an IC chip that outputs the different calculation result to perform recalculation of the cipher calculation. When the recalculation result is the same as the original calculation result, the aforementioned one IC chip starts processing corresponding to a failure and when the recalculation result is different from the original calculation result, the aforementioned one IC chip starts processing corresponding to an attack.

Thereby, a failure and an attack are differentiated from each other and the corresponding processing suitable for each of the failure and the attack is performed. For example, it is possible to prevent originally unnecessary processing corresponding to an attack from being performed by wrongly determining that a software error is an attack.

[5] Corresponding Processing for Differentiating Between Failure and Attack for Chip in Central Layer In paragraph [2], when the calculation result of the aforementioned one IC chip is different from the other calculation results, the aforementioned one IC chip performs recalculation of the cipher calculation. When the recalculation result is the same as the original calculation result, the aforementioned one IC chip starts processing corresponding to a failure and when the recalculation result is different from the original calculation result, the aforementioned one IC chip starts processing corresponding to an attack. Among the plurality of calculation results, when a calculation result of at least one IC chip other than the aforementioned one IC chip is different from the other calculation results, the aforementioned one IC chip starts processing corresponding to an attack.

Thereby, a failure and an attack are differentiated from each other and the corresponding processing suitable for each of the failure and the attack is performed. For example, it is possible to prevent originally unnecessary processing corresponding to an attack from being performed by wrongly determining that a software error is an attack.

[6] Chips Having the Same Function and Different Layouts are Laminated

In anyone of paragraphs [1] to [5], the IC chips have the same circuit configuration, and an arrangement of a circuit that performs the cipher calculation is laid out at positions different from each other in plan view.

Thereby, it is possible to improve the tamper resistance against an attack that is collectively performed on a plurality of laminated chips. This is because the chips are laminated in a state in which arrangements (layouts) of the same function in the chips are shifted from each other, so that effects of an attack that penetrates through the laminated structure reach a portion where a circuit that performs a different function is mounted, and therefore it is possible to detect the attack by multiplexing and comparative verification.

[7] Chip Having the Same Layout is Laminated in a State in Which the Chip is Rotated and/or Turned Upside Down In any one of paragraphs [1] to [5], the IC chips have the same layout and are laminated in a state in which the IC chips are rotated by ±90° or 180° from each other and/or the element surfaces or the substrate surfaces thereof face each other.

Thereby, in the same manner as in paragraph 6, it is possible to improve the tamper resistance against an attack that is collectively performed on a plurality of laminated chips, and further a chip cost can be reduced. Here, "±90°" and "180°" do not mean strict mathematical angles, and they are angles including an industrially acceptable error.

[8] Rotationally Symmetric and/or Linear Symmetric Electrode Arrangement

In paragraph 7, each of the IC chips has a plurality of terminals (21 to 25) having functions respectively, and a terminal having the same function is arranged at least one position of a position rotated by ±90° or 180° around the same point and a symmetrical position with respect to a center line (axis) in parallel with a side of the IC chip.

Thereby, it is possible to couple the IC chips to each other by TSV without using interposers. Here, "the same point", the angles "±90°" and "180°", "in parallel with", "center line (axis)", and "symmetrical" do not define strict mathematical meanings of these terms, and each of them includes an industrially acceptable error. In other words, when an IC chip is laminated in a state in which the IC chip is rotated by ±90° or 180° or in a state in which the IC chip is turned upside down, a shift within a range is acceptable, in which terminals having the same function are electrically coupled to each other and electrical conductivity between them is guaranteed.

[9] VDD/GND/IO/CLOCK/RESET Terminals

In paragraph [8], the terminals include a plurality of power supply terminals (21), a plurality of ground terminals (22), one or a plurality of data input/output terminals (23), one or a plurality of clock terminals (24), and one or a plurality of reset terminals (25)

Thereby, each chip is coupled by a necessary minimum number of terminals.

[10] TSV Coupling

In any one of paragraphs [1] to [9], each of the IC chips has an electrode penetrating through the substrate, and the electrodes are electrically coupled to each other.

Thereby, the chips are coupled to each other by TSV. Interposers may also be used.

[11] Multiplexing of TSV-Laminated Three Chips & Comparative Verification Using Chip in Central Layer The typical embodiments disclosed in the present application are a semiconductor device (100) in which three IC chips (1 to 3; 4 to 6; 7_1 to 7_3) are laminated, each of which has TSV electrodes that penetrate through the substrate. The semiconductor device (100) is configured as follows.

A second IC chip (2; 5; 7_2) is laminated over a first IC chip (3; 6; 7_3) with their TSV electrodes being coupled to each other, and a third IC chip (1; 4; 7_1) is laminated over the second IC chip with their TSV electrodes being coupled to each other.

Each of the first, the second, and the third IC chips performs the same data processing and calculates a processing result of each IC chip. The second IC chip compares the processing results corresponding to the first, the second, and the third IC chips with each other, and controls content of subsequent data processing based on a result of the comparison (53).

Thereby, in data processing including high-speed cipher calculation for which it is not appropriate to employ a leveling technique, it is possible to improve the tamper resistance against an attack to a specific position performed by knowing a layout of functional blocks in a semiconductor chip, such as, for example, the micro-probing, the fault injection by laser irradiation, and the electromagnetic wave analysis. Regarding the second IC chip (2; 5; 7_2) sandwiched between the first and the third IC chips (3 and 1; 6 and 3; 7_3 and 7_1), both of the element surface and the substrate surface are covered by the other laminated IC chips, so that when an attack targeting a specific functional block is received, its influence reaches at least either one of the first and the third IC chips that covers the second IC chip, and thereby it is possible to detect the attack by comparative verification of processing results.

[12] At Least Two Chips Perform Data Processing in Parallel

In paragraph [11], at least two of the first, the second, and the third IC chips perform the aforementioned same data processing in parallel at a time.

Thereby, processing load is distributed and it is possible to make power consumption analysis difficult.

[13] Multiplexing is Set for Each Round Where AES Cipher is Formed

In paragraph [12], the data processing is apart of a series of rounds where cipher processing is configured.

Thereby, for example, in processing of AES cipher configured by a series of rounds, it is possible to set protection using multiplexing for each round.

[14] Cipher Processing is Multiplexed/Normal Processing is Accelerated by Parallel Processing In paragraph [11], when the data processing is cipher processing (50), each of the first, the second, and the third IC chips performs the same cipher processing (50_1 to 50_3) and calculates a processing result (51_1 to 51_3) of each IC chip. The second IC chip compares the processing results corresponding to the first, the second, and the third IC chips with each other (53). When the data processing is other than cipher processing, the first, the second, and the third IC chips divide the data processing into different data processing portions and perform them in parallel.

Thereby, it is possible to improve the tamper resistance of encryption processing, and on the other hand, it is possible to improve processing performance of normal processing by parallel processing.

[15] Assign Processing that Requires Highest Tamper Resistance to IC Chip in Intermediate Layer The typical embodiments disclosed in the present application are a semiconductor device (100) in which a plurality of IC chips (1 to 3; 4 to 7; 7_1 to 7_3; 8 to 10; 11 to 13) are laminated and which can perform data processing including cipher calculation. The semiconductor device (100) is configured as follows.

Among the IC chips, one IC chip (2; 5; 7_2; 9; 12) in the intermediate layer, whose element surface is covered by another IC chip, is caused to perform processing that requires the highest tamper resistance in processing included in the data processing.

Thereby, the processing that requires the highest tamper resistance is protected from an attack from the outside. The element surface of the chip in the intermediate layer is covered by another chip, so that it is possible to improve the tamper resistance against an attack to a specific position performed by knowing a layout of functional blocks in a semiconductor chip, such as, for example, the micro-probing, the fault injection by laser irradiation, and the electromagnetic wave analysis.

[16] Multiplexing Using a Plurality of Chips & Comparative Verification Using IC Chip in Intermediate Layer In paragraph [15], the IC chips perform the same cipher calculation (50_1 to 50_3) in parallel and calculate calculation results (51_1 to 51_3) respectively. The IC chip in the intermediate layer compares the plurality of calculation results corresponding to the IC chips with each other (S2 and S3), and controls content of subsequent data processing (S4 or S5) based on a result of the comparison (53).

Thereby, the processing which compares and verifies the result of parallel processing and which requires the highest tamper resistance in a multiplex system is assigned to the IC chip in the intermediate layer which has the highest security, so that it is possible to improve the tamper resistance of the entire semiconductor device.

[17] Secret Key Calculation in IC Chip in Intermediate Layer

In the paragraph [15], the data processing includes the cipher calculation, the IC chip in the intermediate layer is caused to perform the cipher calculation, and the other IC chips are caused to perform other processing.

Thereby, the cipher calculation which requires the highest tamper resistance is assigned to the IC chip in the intermediate layer which has the highest security, so that it is possible to improve the tamper resistance of the entire semiconductor device.

[18] Signature Processing in IC Chip in Intermediate Layer

In the paragraph [15], the data processing includes signature processing and certificate verification processing as the cipher calculation, the IC chip in the intermediate layer is caused to perform the signature processing, and the other IC chips are caused to perform other processing including the certificate verification processing.

Thereby, the signature processing which requires the highest tamper resistance is assigned to the IC chip in the intermediate layer which has the highest security, so that it is possible to improve the tamper resistance of the entire semiconductor device. On the other hand, the certificate verification processing which requires high speed is assigned to the other chips. The signature has a high degree of secrecy because the signature uses a secret key in the cipher processing. On the other hand, the certificate verification has a relatively low secrecy of information because the certificate verification uses a public key in general. However, the greater the number of certificates to be issued, the higher the required processing speed is.

[19] Both of Top and Bottom Surfaces of IC Chip in Intermediate Layer are Laminated with the Other Chips In any one of the paragraphs [15] to [18], the surface opposite to the element surface of the IC chip in the intermediate layer is further laminated with another IC chip so that the surface is covered by the other IC chip.

Thereby, in the IC chip in the intermediate layer, the resistance against the fault injection from the bottom surface is also improved, and the highest tamper resistance among the IC chips is further increased.

2. Details of Embodiments

The embodiments will be described in further detail.

First Embodiment: Parallel Processing Using Laminated Chips & Comparative Verification Using Chip Whose Element Surface is Covered FIG. 1 is a schematic diagram showing a mounting example of a semiconductor device 100 according to a first embodiment. The semiconductor device 100 has a structure in which three layers of the same semiconductor chips (IC chips, Chip_A, Chip_B, and Chip_C) 1 to 3 are laminated or stacked. The IC chips Chip_A (1), Chip_B (2), and Chip_C (3) used here are, for example, devices which include CPUs 30_1 to 30_3 respectively, ROM 31_1 to 31_3 respectively, and RAM 32_1 to 32_3 respectively. The Chip_C (3) is arranged at the lowest layer (stage). The Chip_B (2) is laminated or stacked over an element surface of the Chip_C (3), and further, the Chip_A (1) is laminated or stacked over an element surface of the Chip_B (2). The Chip_C (3), the Chip_B (2), and the Chip_A (1) are coupled to each other by silicon substrate penetrating electrodes (TSVs: Through Silicon Vias) 20. Although not particularly limited, the IC chips, Chip_A (1), Chip_B (2), and Chip_C (3) are formed over a single semiconductor substrate such as silicon by using, for example, a known CMOS (Complementary Metal-Oxide-Semiconductor field effect transistor) LSI manufacturing technique.

Figure 2:
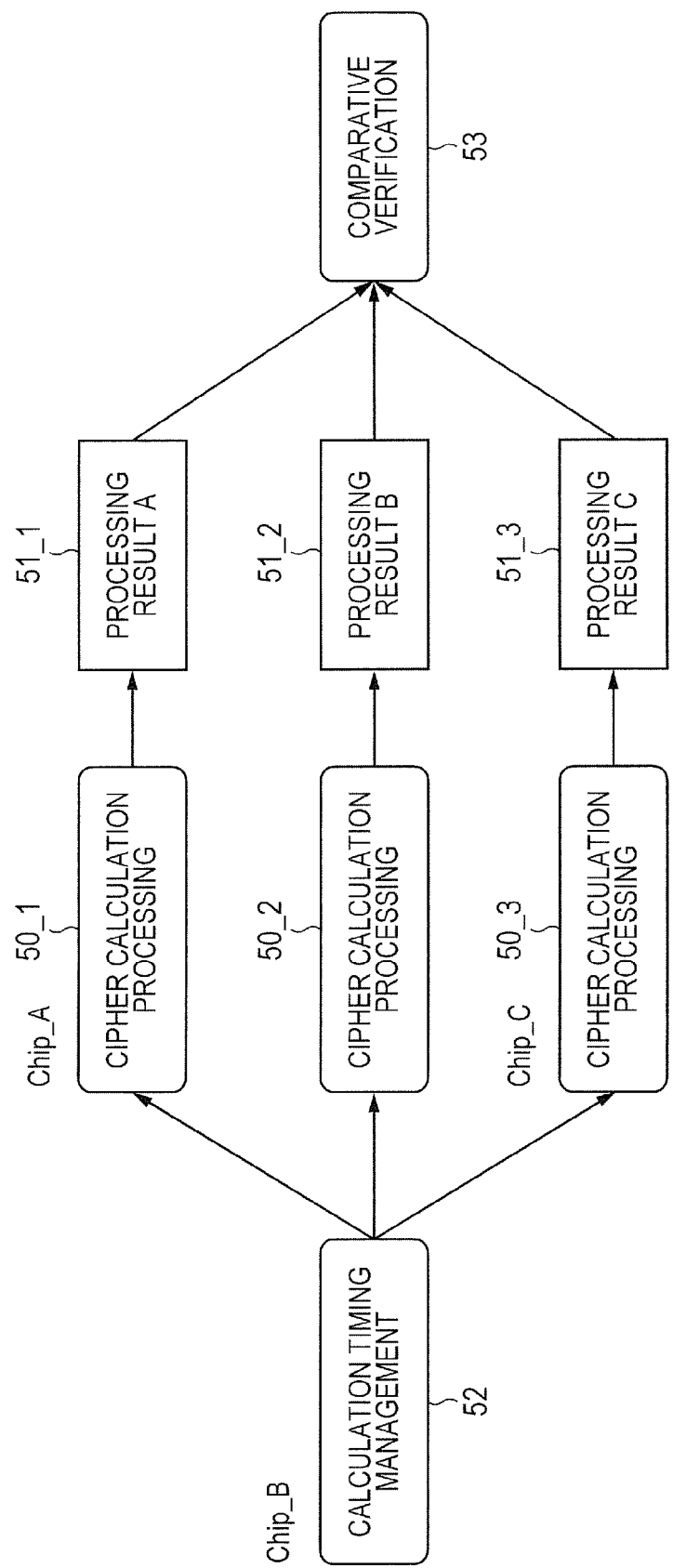
FIG. 2 is an explanatory diagram showing an operation example of each chip included in the semiconductor device.

FIG. 2 is an explanatory diagram showing an operation example of each chip included in the semiconductor device 100.

The three IC chips Chip_A (1), Chip_B (2), and Chip_C (3) are multiplexed to process the same cipher calculation in parallel. The results of the cipher calculation are compared and verified by the IC chip Chip_B (2) in the intermediate layer, so that when there is an attack involving micro-probing and fault injection by laser or the like, the attack is detected, and a process against the attack is prepared. Specifically, the IC chips Chip_A (1), Chip_B (2), and Chip_C (3) perform the same cipher calculation (50_1 to 50_3) in parallel and calculate calculation results (51_1 to 51_3) respectively. The Chip_B (2) in the intermediate layer among the three IC chips compares and verifies the calculation results (51_1 to 51_3) corresponding to the three IC chips Chip_A (1), Chip_B (2), and Chip_C (3) (53). In other words, the Chip_B (2) compares the calculation results (51_1 to 51_3) with each other and controls content of subsequent data processing (S4 and S5) based on the comparison results. It is preferable that the Chip_B (2) performs time management 52 of the entire system.

Thereby, in data processing including high-speed cipher calculation for which it is not appropriate to employ a leveling technique, it is possible to improve the tamper resistance against an attack to a specific position performed by knowing a layout of functional blocks in a semiconductor chip, such as, for example, the micro-probing, the fault injection by laser irradiation, and the electromagnetic wave analysis.

The three IC chips Chip_A (1), Chip_B (2), and Chip_C (3) are multiplexed to process the same cipher calculation in parallel, so that it is assumed that the three chips output the same calculation result. When there is an attack involving micro-probing and fault injection by laser or the like, some of the three IC chips output an incorrect calculation result. When the semiconductor device is triplicated by using three IC chips, it is substantially impossible to perform fault injection that injects the same fault into all of the three chips at the same time. Therefore, it is possible to detect that there is an attack by comparing the three calculation results with each other, and an appropriate process to cope with the attack can be prepared. However, if a fault is directly injected into a circuit that compares and verifies the three calculation results, it maybe difficult to detect this as an attack from the outside. Therefore, in the present embodiment, the function of the comparative verification is assigned to the IC chip Chip_B (2) in the intermediate layer. This is because the IC chip Chip_B (2) in the intermediate layer has the highest tamper resistance among the three chips. In the IC chip Chip_B (2) in the intermediate layer, the element surface is covered by the IC chip Chip_A (1) in the upper layer, and the substrate surface is covered by the IC chip Chip_C (3) in the lower layer. Therefore, the micro-probing and the fault injection by laser irradiation to the IC chip Chip_B (2) in the intermediate layer inevitably affect the IC chip Chip_A (1) in the upper layer if the attack is from the top surface, or inevitably affect the IC chip Chip_C (3) in the lower layer if the attack is from the bottom surface, so that it is assumed that the same three calculation results cannot be outputted. In this manner, when there is the fault injection, it is possible to appropriately detect the fault injection and prepare a process to cope with the attack. Therefore, it is not necessarily required to level the processing and the circuit in order to cope with a side channel attack such as the power consumption analysis and the electromagnetic wave analysis involving the fault injection.

In the present embodiment, an example is described in which the semiconductor device is triplicated by using three chips. However, the semiconductor device may be duplicated by using two chips. At this time, it is preferable that the IC chip having the function of the comparative verification is an IC chip whose element surface is covered by the other IC chip. This is because the micro-probing from the bottom surface (the substrate surface) is impossible, and the accuracy of the fault injection by laser is low because the laser light is absorbed and scattered by the substrate, so that it is possible to maintain the tamper resistance at a relatively high level against these attacks. It is possible to employ multiplexing where four or more chips are laminated. At this time, four chips may be operated in parallel and four processing results may be compared and verified, or two chips maybe operated in parallel at a time and two processing results of the two chips may be compared and verified at a time. Furthermore, three chips maybe operated in parallel and three processing results maybe compared and verified as described above, while the other chips may be caused to perform normal processing that does not require security in parallel.

It is preferable that the three IC chips Chip_A (1), Chip_B (2), and Chip_C (3) are the same chip. However, the arrangements (layouts) of the electrodes (TSV) may be different from each other. The chip may be laminated by rotating by ±90° or 180° or reversing the chip to bond element surfaces together or to bond substrate surfaces together. The details will be described later in a third embodiment. This is because the three IC chips Chip_A (1), Chip_B (2), and Chip_C (3) are the same chip at this time, so that if the same processing is started at the same time, it is assumed that the same calculation results (processing results) can be obtained at the same time. Further, when the same chips are used, it is possible to reduce the cost by a mass production effect, such as reduction of the number of masks in a semiconductor manufacturing process.

Figure 3:
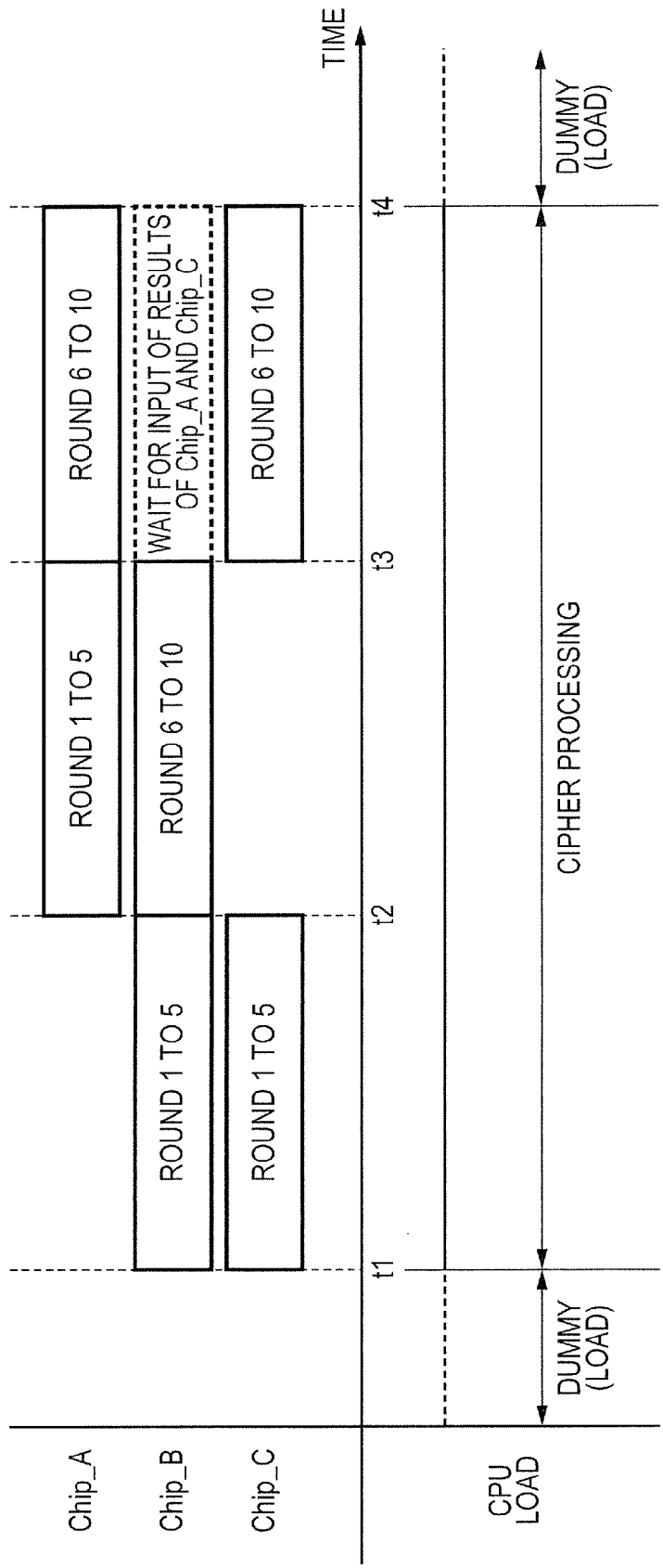
FIG. 3 is an explanatory diagram showing an operation example of a cipher calculation performed by each chip included in the semiconductor device.

While an example is described in which each of the three IC chips Chip_A (1), Chip_B (2), and Chip_C (3) has TSVs and the TSVs are coupled to each other between the laminated IC chips, it is also possible to insert an interposer between the chips so that one TSVs are coupled to other TSVs whose layout is different from that of the one TSVs. It is possible to couple between the chips by wire bonding or the like instead of the TSVs. Time Management FIG. 3 is an explanatory diagram showing an operation example of a cipher calculation performed by each chip included in the semiconductor device 100. The horizontal axis represents time. In the vertical axis direction, content of cipher calculation performed by the chips Chip_A (1), Chip_B (2), and Chip_C (3) and a CPU load are shown. As an example of the cipher calculation, AES-128 (Advanced Encryption Standard-128), which is one of common key cryptography methods, is employed. The AES-128 includes encryption operations of rounds 1 to 10. FIG. 3 is a flowchart of an operation example in which time management is applied to round processing of the AES-128.

According to the time management 52 created by the Chip_B (2), which is described in FIG. 2, the Chip_B (2) and the Chip_C (3) start processing of rounds 1 to 5 at time t1. The processing of rounds 1 to 5 is completed by time t2 and the processing of the Chip_C (3) is interrupted, and further the Chip_A (1) starts processing of rounds 1 to 5. The Chip_B (2) continuously performs processing of rounds 6 to 10. The Chip_B (2) completes the processing of round 10 at time t3 and generates a processing result B (51_2). Also at time t3, the Chip_C (3), which has been interrupted, starts processing of rounds 6 to 10. The Chip_A (1) completes the processing of rounds 1 to 5 by time t3 and starts processing of rounds 6 to 10. The Chip_A (1) and the Chip_C (3) complete the processing of rounds 6 to 10 by time t4 and generate a processing result A (51_1) and a processing result C (51_3), respectively.

The Chip_B (2) completes the processing earliest among the three chips, so that the Chip_B (2) waits until the processing results A, B, and C (51_1 to 51_3) of the Chip_A (1), the Chip_B (2), and the Chip_C (3) are all present, and starts the comparative verification 53 from time t4 at which the processing results A, B, and C are all present. By performing such a time management, it is possible to distribute the processing load of CPU and make it difficult to perform the power consumption analysis. The main processing load of CPU is cipher processing from time t1 to time t4 and is other processing before time t1 and after time t4. However, the processing load of CPU may be leveled by adding dummy processing (load) in periods before time t1 and after time t4. Thereby, it is possible to make it more difficult to perform the power consumption analysis.

As obvious from the above description, "to process the same cipher calculation in parallel" in the present embodiment is not necessarily required to simultaneously process the same cipher calculation in parallel. The same cipher calculation may be processed in different chips. When the same cipher calculation is simultaneously processed in parallel, it is possible to reduce the processing time of the entire data processing and contribute to speeding up. However, as illustrated in FIG. 3, it is possible to level the consumption current by distributing the CPU load and to improve the tamper resistance against the power consumption analysis.

Comparative Verification

Figure 4:
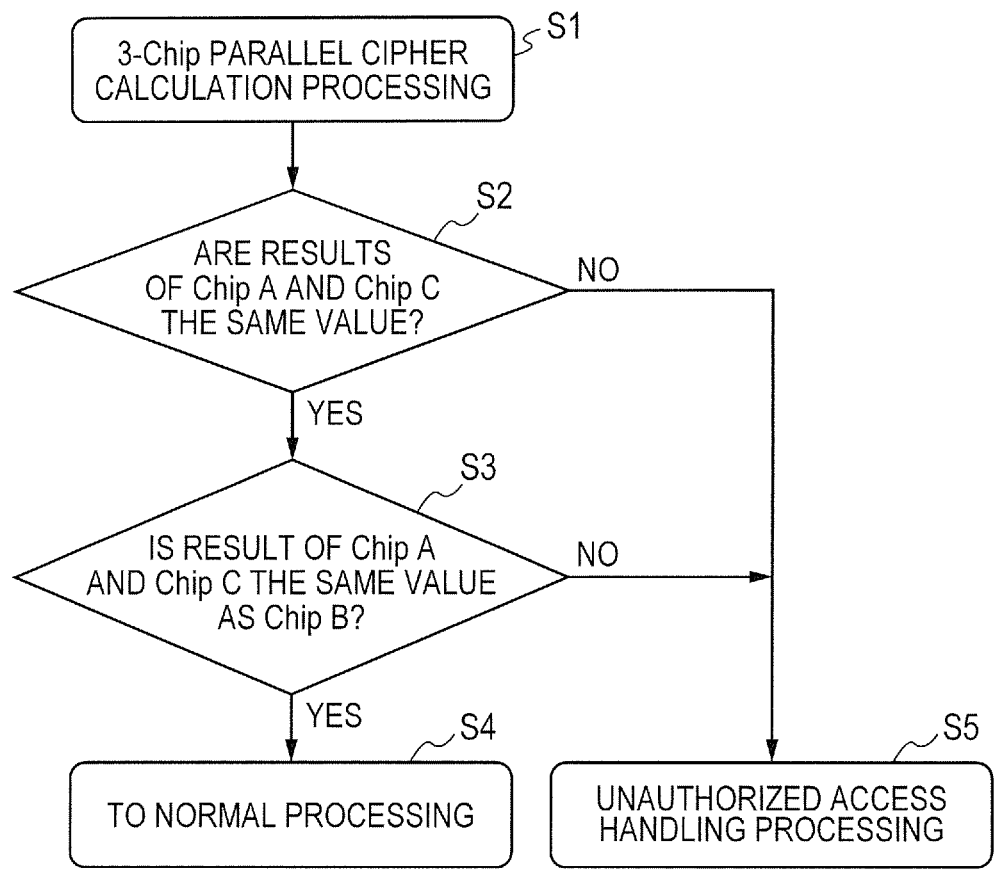
FIG. 4 is a flowchart showing an operation example of comparative verification.

FIG. 4 is a flowchart showing an operation example of the comparative verification 53. Three-chip parallel cipher calculation processing is performed (S1). Non-simultaneous parallel processing may be performed in order to level the processing load of CPU as illustrated in FIG. 3, or simultaneous parallel encryption processing may be performed. When the processing result A (51_1) and the processing result C (51_3), which are the results of the cipher processing of the Chip_A (1) and the Chip_C (3) respectively, are both present, the processing result A (51_1) of the Chip_A (1) and the processing result C (51_3) of the Chip_C (3) are compared with each other (S2). When the processing result A (51_1) of the Chip_A (1) and the processing result C (51_3) of the Chip_C (3) are different from each other, the process proceeds to illegal attack handling processing (S5). When the processing result A (51_1) of the Chip_A (1) and the processing result C (51_3) of the Chip_C (3) are the same, the process proceeds to the next determination (S3) and the result (the processing result A (51_1)=the processing result C (51_3)) and the processing result B (51_2) of the Chip_B (2) are compared with each other (S3). When the processing result A (51_1)=the processing result C (51_3) and the processing result B (51_2) of the Chip_B (2) are different from each other, the process proceeds to the illegal attack handling processing (S5). As a result of the cipher processing of each of the three chips Chip_A (1), Chip_B (2), and Chip_C (3), when the processing result A (51_1), the processing result B (51_2), and the processing result C (51_3) are all the same, the process returns to normal processing (S4).

As a result of the cipher processing of each of the three chips Chip_A (1), Chip_B (2), and Chip_C (3), when at least one of the processing result A (51_1), the processing result B (51_2), and the processing result C (51_3) is different from the other processing results, it is determined that an illegal attack is received and the process proceeds to the illegal attack handling processing (S5). The illegal attack handling processing (S5) is processing that handles the attack, and for example, processing such as deleting data in the RAM 32 and the ROM 31 in order to protect confidential data is performed. Further, when a management device such as a server is externally coupled, it may be configured so that the fact that the attack is being received or the attack has been received is reported to the management device.

Illegal Attack Handling Processing

The illegal attack handling processing (S5) is appropriately designed based on a security policy. There are various modified examples of the security policy, such as from a security focused type that most emphasizes security to a function focused type that is intended to continue normal processing as long as possible. This is because even when a processing result different from the other processing results is detected in multiplexed parallel processing, it does not necessarily mean that a side channel attack is received. As other causes that generate a processing result different from the other processing result, a temporary or permanent failure due to an operating environment such as a temperature outside of acceptable range and a software error due to power-supply noise, electromagnetic noise, and alpha rays are considered. A flow to return to normal processing in the case of a temporary failure and a software error may be included, and a flow to protect information which should be kept secret and which is stored in a ROM in the case of a permanent failure may be included. These flows are specified based on a security policy that is appropriately specified according to an apparatus in which the semiconductor device 100 is mounted.

FIG. 5 is an explanatory diagram of content of the illegal attack handling processing. An example of the security focused type and an example of the function focused type are shown. As a result of the cipher processing of each of the three chips Chip_A (1), Chip_B (2), and Chip_C (3), a case is classified according to whether one of the processing result A (51_1), the processing result B (51_2), and the processing result C (51_3) is the same as or different from the processing results of the other chips, and content of processing of each case is illustrated.

In the security focused type, when the processing result A (51_1), the processing result B (51_2), and the processing result C (51_3) of the Chip_A (1), the Chip_B (2), and the Chip_C (3) are all the same, the operation is determined to be normal, and the process proceeds to the next normal processing (S4 in FIG. 4). When one of the processing result A (51_1) of the Chip_A (1) or the processing result C (51_3) of the Chip_C (3) is different from the processing results of the other two chips, it is determined that there is an attack and the processing is interrupted, and then an abnormal end is reported. When the processing result B (51_2) of the Chip_B (2) is different from the processing results of the other two chips, the Chip_B (2) is caused to perform reprocessing. All of the three chips may be caused to perform reprocessing. Thereby, the power consumption is leveled even while the reprocessing is being performed, so that it is possible to maintain the tamper resistance against an attack involving the power consumption analysis. When the processing result B (51_2) after the reprocessing is the same value as that of the processing result B (51_2) before the reprocessing and is different from the processing results of the other two chips, it is determined that there is a failure and a failure is reported. When the processing result B (51_2) after the reprocessing is a value different from the processing result B (51_2) before the reprocessing, it is determined that there is an attack and an abnormal end is reported.

When three chips are laminated, the chips of the top surface and the bottom surface, which are the Chip_A (1) and the Chip_C (3) in this example, are relatively vulnerable to the fault injection, so that it is technically difficult to perform the fault injection on only the Chip_B (2) in the intermediate layer without affecting the chip of the top surface or the bottom surface. Therefore, when the processing result B (51_2) of the Chip_B (2) in the intermediate layer is different from the processing results of the other two chips, the possibility of failure is high, so that reprocessing is performed to check the failure. In the case of permanent failure, it is considered that the generated processing result B (52_2) is the same value. Therefore, when the generated processing result B (52_2) is the same value and is different from the processing results of the other two chips, it is determined that there is a failure. On the other hand, in the case of fault injection, it is generally impossible to inject a failure of the same value. Therefore, when the result of reprocessing is a different value and is different from the processing results of the other two chips, it is determined that there is an attack and the processing is interrupted, and then an abnormal end is reported.

When the processing result B (51_2) of the Chip_B (2) in the intermediate layer is different from the processing results of the other two chips, in the same manner as in the case in which one of the processing result A (51_1) of the Chip_A (1) or the processing result C (51_3) of the Chip_C (3) is different from the processing results of the other two chips, it is immediately determined that there is an attack and the processing is interrupted, and then an abnormal end may be reported.

Also in the function focused type, when the processing result A (51_1), the processing result B (51_2), and the processing result C (51_3) of the Chip_A (1), the Chip_B (2), and the Chip_C (3) are all the same, the operation is determined to be normal, and the process proceeds to the next normal processing (S4 in FIG. 4). When one of the processing result A (51_1) of the Chip_A (1), the processing result B (51_2) of the Chip_B (2), or the processing result C (51_3) of the Chip_C (3) is different from the processing results of the other two chips, the chip that outputs the different processing result is caused to perform reprocessing. All of the three chips maybe caused to perform reprocessing. Thereby, the power consumption is leveled even while the reprocessing is being performed, so that it is possible to maintain the tamper resistance against an attack involving the power consumption analysis. In the chip which has performed the reprocessing, when the processing result after the reprocessing is the same value as that of the processing result before the reprocessing and is different from the processing results of the other two chips, it is determined that there is a failure and a failure is reported. This is a countermeasure assuming that a permanent failure occurs in one of the three chips. On the other hand, when the processing result after the reprocessing is a value different from the processing result before the reprocessing, it is determined that there is an attack and an abnormal end is reported.

In the processing to cope with an attack, to protect information that should be confidential, for example, processing to delete data in RAM and ROM is performed. However, in the processing to cope with a failure, information stored in ROM is preserved even if the information should be confidential. However, this is an example, and whether to delete or preserve information to be confidential should be defined by security policy for each application for each apparatus on which the semiconductor device 100 is mounted.

Second Embodiment: The Same Function×Different Layouts

Figure 6:
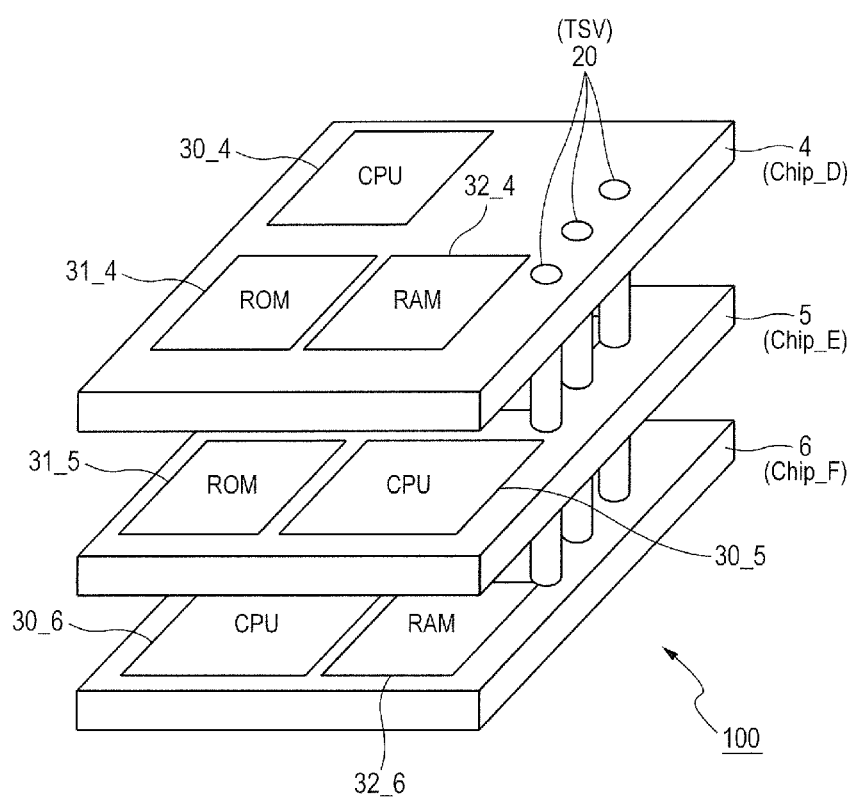
FIG. 6 is a schematic diagram showing a mounting example of a semiconductor device according to a second embodiment.

FIG. 6 is a schematic diagram showing a mounting example of a semiconductor device 100 according to a second embodiment. The semiconductor device 100 has a structure in which three layers of semiconductor chips (IC chips, Chip_D, Chip_E, and Chip_F) 4 to 6 are laminated. The Chip_F (6) is arranged at the lowest layer. The Chip_E (5) is laminated over an element surface of the Chip_F (6), and further, the Chip_D (4) is laminated over an element surface of the Chip_E (5). The Chip_F (6), the Chip_E (5), and the Chip_D (4) are coupled to each other by silicon substrate penetrating electrodes (TSVs) 20. In the same manner as the semiconductor device of the first embodiment shown in FIG. 1, the IC chips Chip_D (4), Chip_E (5), and Chip_F (6) have the same function respectively and include, for example, CPUs 30_4 to 30_6 respectively, ROMs 31_4 to 31_6 respectively, and RAMs 32_4 to 32_6 respectively. However, the arrangement (layout) of functional blocks mounted on each IC chip is different from each other.

For the side channel attack, there is a method that analyzes electromagnetic waves leaked from a chip and identifies an attacked portion. The method uses a phenomenon in which an electromagnetic wave leaked from a CPU increases in proportion to the power supplied to the CPU because larger power is supplied to the CPU when a calculation is performed.

As shown in FIG. 6, in the laminated IC chips Chip_D (4), Chip_E (5), and Chip_F (6), the IC chips are laminated or stacked so that the positions where the CPUs 30_4 to 30_6 are arranged (laid out) are different from each other. Thereby, the strengths of electromagnetic waves leaked from the chips are leveled in a surface, so that it makes it difficult to identify the positions of the CPUs 30_4 to 30_6. Therefore, it is possible to increase the resistance against the attack described above.

Regarding the parallel operation, the comparative verification, and the illegal attack handling processing, the semiconductor device 100 according to the second embodiment can operate in the same manner as the first embodiment, so that the description of these operations will be omitted.

FIG. 6 shows that the locations of the CPUs 30_4 to 30_6 are significantly different from each other. However, the locations need not be completely different from each other, but may be partially overlapped with each other. When the CPUs 30_4 to 30_6 are arranged to overlap with each other, it is difficult for an attacker to identify a position to be attacked. Further, it is possible to improve the tamper resistance against an attack that is collectively performed on a plurality of laminated chips. This is because the chips are laminated in a state in which arrangements (layouts) of the same function in the chips are shifted from each other, so that effects of an attack that penetrates through the laminated structure reach portions in each of which a different function is performed on a circuit surface, and therefore it is possible to detect the attack by multiplexing and comparative verification.

Figure 7:
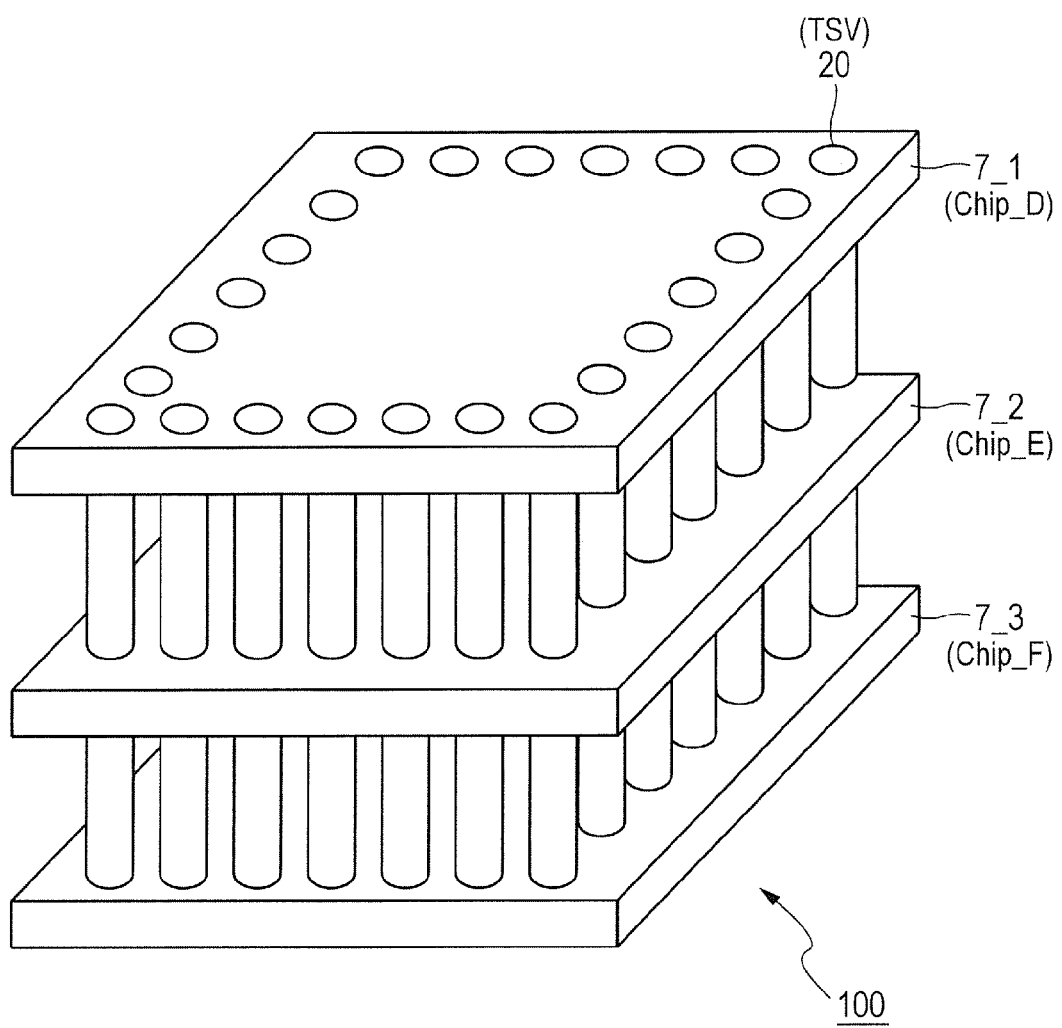
FIG. 7 is a schematic diagram showing a mounting example of a semiconductor device according to a third embodiment.

Third Embodiment: The Same Function×the Same Layout×Rotation and/or Reversal of Chip FIG. 7 is a schematic diagram showing a mounting example of a semiconductor device 100 according to a third embodiment. The semiconductor device 100 has a structure in which three layers of the same semiconductor chips (IC chips, Chip_D, Chip_E, and Chip_F) 7_1 to 7_3 are laminated or stacked. The Chip_F (7_3) is arranged at the lowest layer. The Chip_E (7_2) is laminated over the Chip_F (7_3), and further, the Chip_D (7_1) is laminated over the Chip_E (7_2). The Chip_F (7_3), the Chip_E (7_2), and the Chip_D (7_1) are coupled to each other by silicon substrate penetrating electrodes (TSVs) 20. Each of the IC chips Chip_D (7_1), Chip_E (7_2), and Chip_F (7_3) is the same chip having the same function and the same layout. However, a relative arrangement of circuit blocks having the same functions can be different for each chip when seen from the top surface by laminating the IC chips by rotating, reversing, or reversing and further rotating the IC chips.

Thereby, in the same manner as in the second embodiment, it is possible to make it difficult to identify a portion to be attacked, and it is also possible to improve the tamper resistance against an attack that is collectively performed on a plurality of laminated chips. Further, the laminated chips are the same chips, so that it is possible to reduce the chip cost.

Here, when the same chips having the same function and the same layout are laminated by rotating, reversing, or reversing and further rotating the chips, if electrodes of the same function are arranged to be located at the same positions, the upper and lower electrodes of the same function can be coupled to each other without inserting an interposer or by only inserting an interposer having a simple structure that only linearly couples the upper and lower electrodes.

FIGS. 8 to 11 show examples of electrode arrangement in each chip. An IC card is an example of a device in which a semiconductor device that performs data processing including cipher calculation is mounted. An interface specification of IC card including electrodes is specified by standard specification. For example, International Standard ISO/IEC 7816-2 stipulates that an IC card should includes five electrodes including power supply (VDD), ground (GND), data input/output (I/O), clock (Clock), and reset (Reset) as electrodes. In general, it is considered that the greater the number of terminals is, the lower the security level (the tamper resistance) is, so that the necessary minimum number of terminals should be used. In FIGS. 8 to 11, the power supply (VDD), the ground (GND), the data input/output (I/O), the clock (Clock), and the reset (Reset) are represented by circled numbers 1 to 5 respectively. A plurality of data input/output (I/O) electrodes are provided in one chip. However, the data input/output (I/O) electrodes are not electrodes for inputting/outputting multi-bit data in parallel, but electrodes where functionally same one-bit-serial data input/output (I/O) electrodes are provided electrically in parallel.

Figure 8:
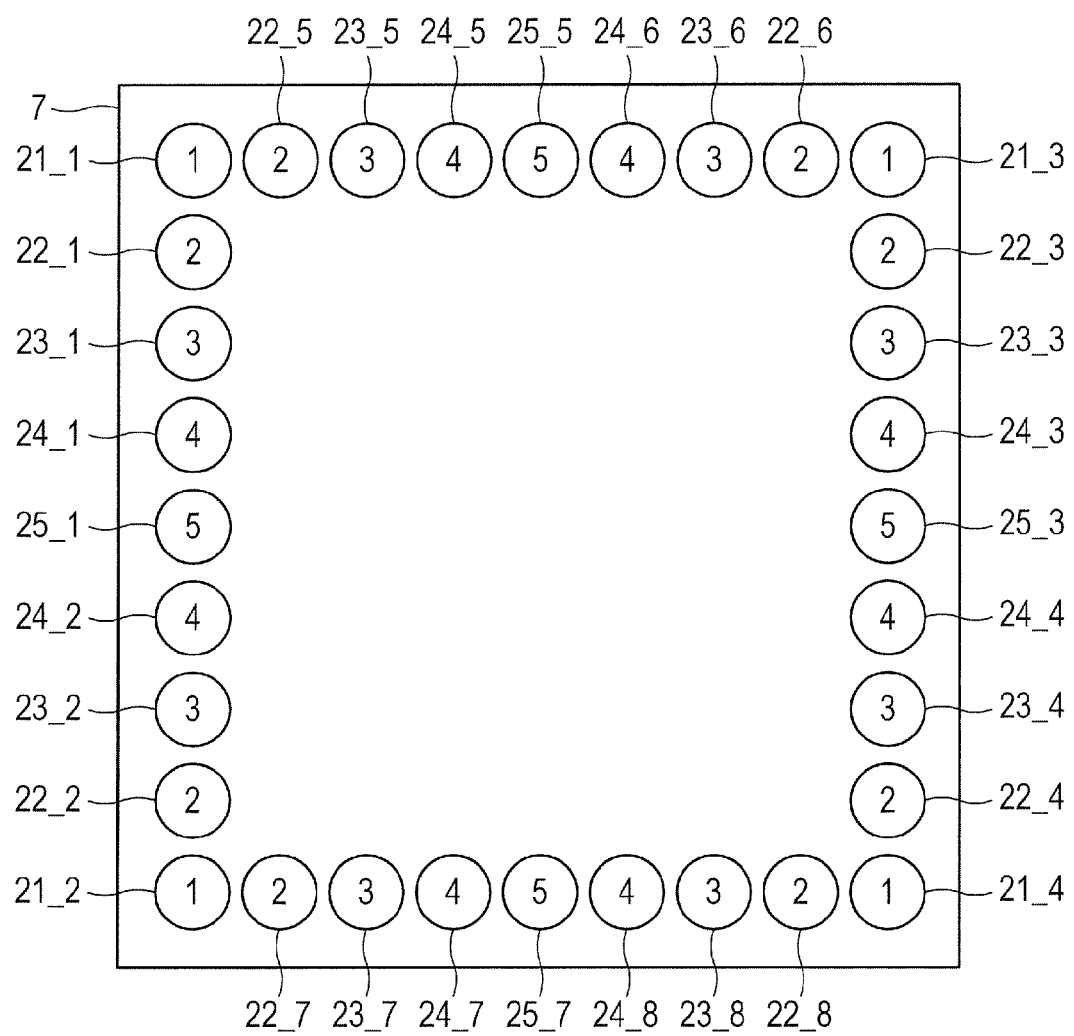
FIG. 8 is a layout diagram showing a first arrangement example of electrodes in each chip.

FIG. 8 is a layout diagram showing a first arrangement example of electrodes in each chip.

At the left side, VDD $21\_1$, GND $22\_1$, I/O $23\_1$, Clock $24\_1$, Reset $25\_1$, Clock $24\_2$, I/O $23\_2$, GND $22\_2$, and VDD $21\_2$ are arranged in order.

At the right side, VDD $21\_3$, GND $22\_3$, I/O $23\_3$, Clock $24\_3$, Reset $25\_3$, Clock $24\_4$, I/O $23\_4$, GND $22\_4$, and VDD $21\_4$ are arranged in order.

At the upper side, VDD $21\_1$, GND $22\_5$, I/O $23\_5$, Clock $24\_5$, Reset $25\_5$, Clock $24\_6$, I/O $23\_6$, GND $22\_6$, and VDD $21\_3$ are arranged in order.

At the lower side, VDD $21\_2$, GND $22\_7$, I/O $23\_7$, Clock $24\_7$, Reset $25\_7$, Clock $24\_8$, I/O $23\_8$, GND $22\_8$, and VDD $21\_4$ are arranged in order.

The electrodes of the left side are arranged to overlap with the same function electrodes of the upper side, respectively, when the chip is rotated by +90°, arranged to overlap with the same function electrodes of the lower side, respectively, when the chip is rotated by −90°, and arranged to overlap with the same function electrodes of the right side, respectively, when the chip is rotated by 180°. Specifically, VDD $21\_1$, GND $22\_1$, I/O $23\_1$, Clock $24\_1$, and Reset $25\_1$ overlaps with VDD $21\_3$, GND $22\_6$, I/O $23\_6$, Clock $24\_6$, and Reset $25\_5$, respectively, when the chip is rotated by +90°, and overlaps with VDD $21\_2$, GND $22\_7$, I/O $23\_7$, Clock $24\_7$, and Reset $25\_7$, respectively, when the chip is rotated by −90°. When the chip is rotated by 180°, VDD $21\_1$, GND $22\_1$, I/O $23\_1$, Clock $24\_1$, and Reset $25\_1$ overlap with VDD $21\_4$, GND $22\_4$, I/O $23\_4$, Clock $24\_4$, and Reset $25\_3$.

The electrodes of the left side are arranged to overlap with the same function electrodes of the right side, respectively, when the chip is turned upside down by using the center line of the upper and lower sides as a symmetry axis, and are arranged to overlap with the same function electrodes of the same left side, respectively, when the chip is turned upside down by using the center line of the left and right sides as a symmetry axis. As a result, when the chip is laminated by being turned upside down by using the center line of the upper and the lower sides as a symmetry axis, VDD $21\_1$, GND $22\_1$, I/O $23\_1$, Clock $24\_1$, and Reset $25\_1$ overlap with VDD $21\_3$, GND $22\_3$, I/O $23\_3$, Clock $24\_3$, and Reset $25\_3$, respectively. When the chip is laminated by being turned upside down by using the center line of the left and the right sides as a symmetry axis, VDD $21\_1$, GND $22\_1$, I/O $23\_1$, Clock $24\_1$, and Reset $25\_1$ overlap with VDD $21\_2$, GND $22\_2$, I/O $23\_2$, Clock $24\_2$, and Reset $25\_1$ of the same left side, respectively.

This is the same for the electrodes of the other sides. Further, electrodes are arranged (laid out) so that when a chip is laminated after being turned upside down and rotated by ±90° or 180°, electrodes having the same function are located at the same position in the same manner. The chips have a square shape. However, when only the electrodes are arranged in a square shape, the chips need not have a square shape. To arrange all the electrodes so as to overlap with electrodes having the same function after being rotated by ±90° or 180°, all the electrodes need to be arranged to locations rotated by ±90° or 180° around the same point. To arrange all the electrodes so as to overlap with electrodes having the same function after the chip is turned upside down and laminated, all the electrodes need to be arranged at locations symmetric to the electrodes with a line in parallel with a side of the chip (to be exact, in parallel with a line on which the electrodes are arranged) as the axis of symmetry. When the arrangement of the electrodes is not in parallel with a side of the chip, the electrodes need to be arranged at positions symmetric to the electrodes with a line in parallel with the arrangement of the electrodes as the axis of symmetry. The functions shown for the electrodes are an example, and the order of the electrodes is arbitrarily defined. Here, the terms such as "the same point", the angles "±90°" and "180°", "line in parallel with", "axis of symmetry", and "symmetrical" do not define strict mathematical meanings of these terms, and each of them includes an industrially acceptable error. In other words, when an IC chip is laminated in a state in which the IC chip is rotated by ±90° or 180° or in a state in which the IC chip is turned upside down, a shift within a range is acceptable, in which electrical conductivity between terminals having the same function is guaranteed.

Figure 9:
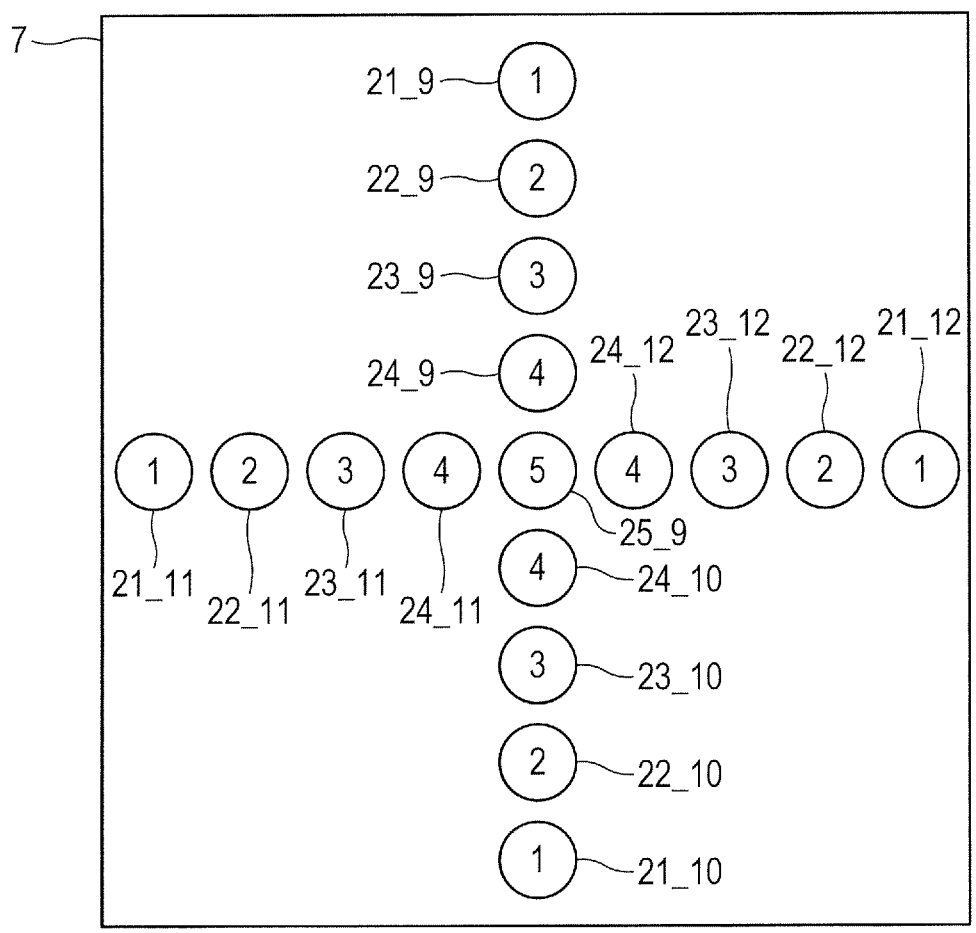
FIG. 9 is a layout diagram showing a second arrangement example of electrodes in each chip.

FIG. 9 is a layout diagram showing a second arrangement example of electrodes in each chip. In the vertical direction, VDD $21\_9$, GND $22\_9$, I/O $23\_9$, Clock $24\_9$, Reset $25\_9$, Clock $24\_10$, I/O $23\_10$, GND $22\_10$, and VDD $21\_10$ are arranged in order. In the horizontal direction, VDD $21\_11$, GND $22\_11$, I/O $23\_11$, Clock $24\_11$, Reset $25\_9$, Clock $24\_12$, I/O $23\_12$, GND $22\_12$, and VDD $21\_12$ are arranged in order. The gaps between the electrodes in the vertical direction are set to be equal to the gaps between the electrodes in the horizontal direction, and the electrodes in the vertical direction and the electrodes in the horizontal direction are arranged in a cross shape so that they cross each other at right angles. At this time, when the chip is rotated by ±90°, the electrodes in the vertical direction overlap with the electrodes having the same function in the horizontal direction, and when the chip is rotated by 180°, the electrodes in the vertical direction overlap with the electrodes having the same function in the vertical direction rotated by 180°, and the electrodes in the horizontal direction overlap with the electrodes having the same function in the horizontal direction rotated by 180°. Further, when the chip is turned upside down in the vertical direction or the horizontal direction, the electrodes are arranged to overlap with the electrodes having the same function in the same manner.

The cross-shaped arrangement of the electrodes may be located at the center of the chip. However, the arrangement need not be necessarily located at the center of the chip and need not be in a positional relationship of vertical or horizontal to each side of the chip.

The functions shown for the electrodes are an example, and the order of the electrodes is arbitrarily defined. However, only one electrode is located at the center in the chip. To lower the power supply impedance, the greater the number of power supply electrodes (VDD) and the ground electrodes (GND), the better. The lower the impedance of the data input/output (I/O) and the clock (Clock), the better. Therefore, relatively assigning the reset (Reset) is preferable. It is possible to arrange no electrode at the central point and to arrange five electrodes at each of the four sides of the cross shape.

Figure 10:
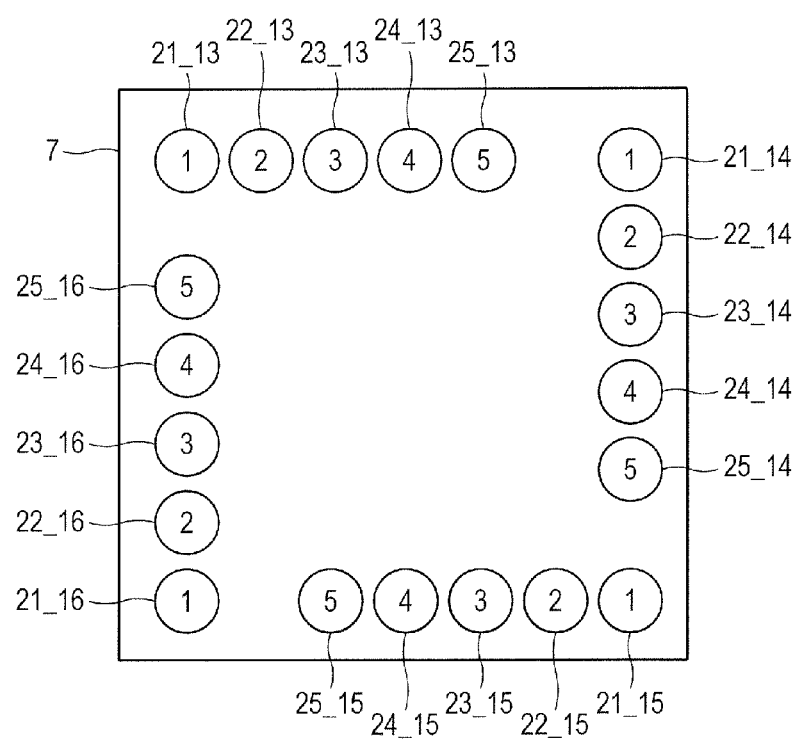
FIG. 10 is a layout diagram showing a third arrangement example of electrodes in each chip.
Figure 11:
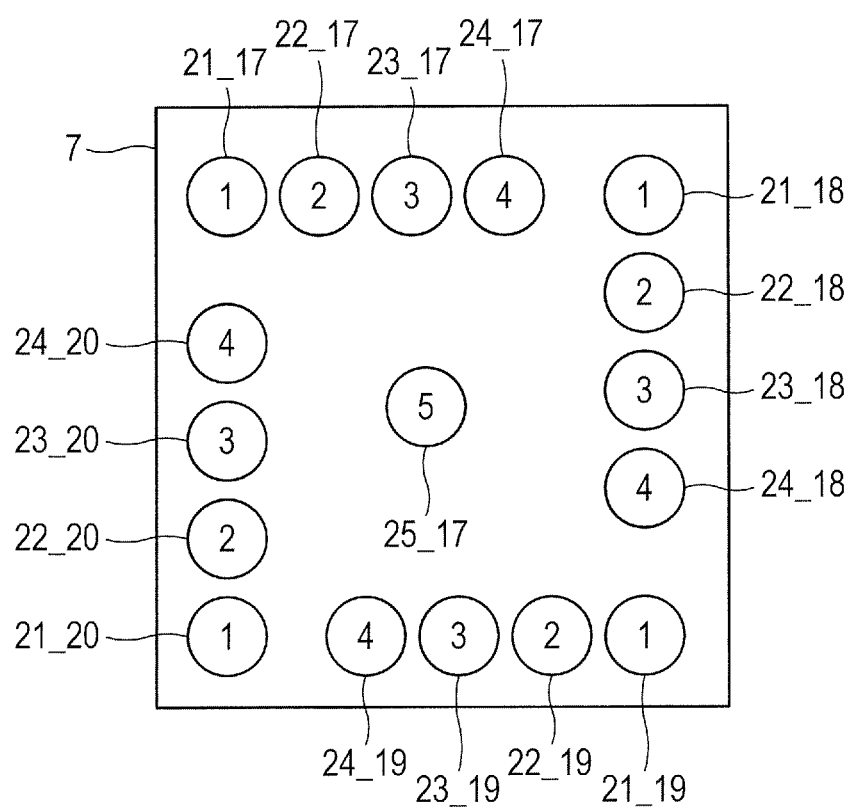
FIG. 11 is a layout diagram showing a fourth arrangement example of electrodes in each chip.

When it is not considered to laminate a chip by turning it upside down, as shown in FIGS. 10 and 11, electrode arrangements used only for rotation of the chip can be employed.

FIG. 10 is a layout diagram showing a third arrangement example of electrodes in each chip.

At the upper side, VDD 21_13, GND 22_13, I/O 23_13, Clock 24_13, and Reset 25_13 are arranged in order. At the right side, VDD 21_14, GND 22_14, I/O 23_14, Clock 24_14, and Reset 25_14 are arranged in order. At the lower side, VDD 21_15, GND 22_15, I/O 23_15, Clock 24_15, and Reset 25_15 are arranged in order. At the left side, VDD 21_16, GND 22_16, I/O 23_16, Clock 24_16, and Reset 25_16 are arranged in order. The five electrodes at each side are arranged at the same interval as that of the five electrodes of the other sides. The electrodes of the upper side, the right side, the lower side, and the left side are arranged to overlap with the same function electrodes of the right side, the lower side, the left side, and the upper side, respectively, when the chip is rotated by +90°, arranged to overlap with the same function electrodes of the left side, the upper side, the right side, and the lower side, respectively, when the chip is rotated by −90°, and arranged to overlap with the same function electrodes of the lower side, the left side, the upper side, and the right side, respectively, when the chip is rotated by 180°.

It is possible to reduce the number of electrodes as compared with the arrangement example of the first arrangement example shown in FIG. 8, so that when the chip size is constrained by the number of terminals (the number of electrodes), it is possible to reduce the chip size.

FIG. 11 is a layout diagram showing a fourth arrangement example of electrodes in each chip.

At the upper side, VDD 21_17, GND 22_17, I/O 23_17, and Clock 24_17 are arranged. At the right side, VDD 21_18, GND 22_18, I/O 23_18, and Clock 24_18 are arranged. At the lower side, VDD 21_19, GND 22_19, I/O 23_19, and Clock 24_19 are arranged. At the left side, VDD 21_20, GND 22_20, I/O 23_20, and Clock 24_20 are arranged. Only one Reset 25_17 is arranged at the center. The four electrodes at each side are arranged at the same interval and in the same order as those of the four electrodes at the other four sides. The electrodes of the upper side, the right side, the lower side, and the left side are arranged to overlap with the same function electrodes of the right side, the lower side, the left side, and the upper side, respectively, when the chip is rotated by +90°, arranged to overlap with the same function electrodes of the left side, the upper side, the right side, and the lower side, respectively, when the chip is rotated by −90°, and arranged to overlap with the same function electrodes of the lower side, the left side, the upper side, and the right side, respectively, when the chip is rotated by 180°.

As compared with the arrangement example of the fourth arrangement example shown in FIG. 10, it is possible to reduce the number of electrodes by reducing the number of reset electrodes to one, so that when the chip size is constrained by the number of terminals (the number of electrodes), it is possible to further reduce the chip size.

Fourth Embodiment: Chip Performing Encryption Processing is Laminated in an Intermediate Layer An technical idea disclosed in the specification of this application is to assign processing requiring the highest tamper resistance in the entire data processing to a chip in an intermediate layer, that is, a chip whose element surface is covered by another chip, in the semiconductor device 100 formed by laminating a plurality of IC chips. In the first to the third embodiments, the entire data processing is multiplexed as cipher calculations, and a function to compare and verify the processing results of the cipher calculations requires the highest tamper resistance. Therefore, the function to compare and verify the processing results is assigned to the chip in the intermediate layer. When seeing the entire data processing from a wider perspective, in the data processing including the cipher calculation, the cipher calculation which requires the highest tamper resistance can be assigned to the chip in the intermediate layer, and the other processing can be assigned to the other chips.

Figure 12:
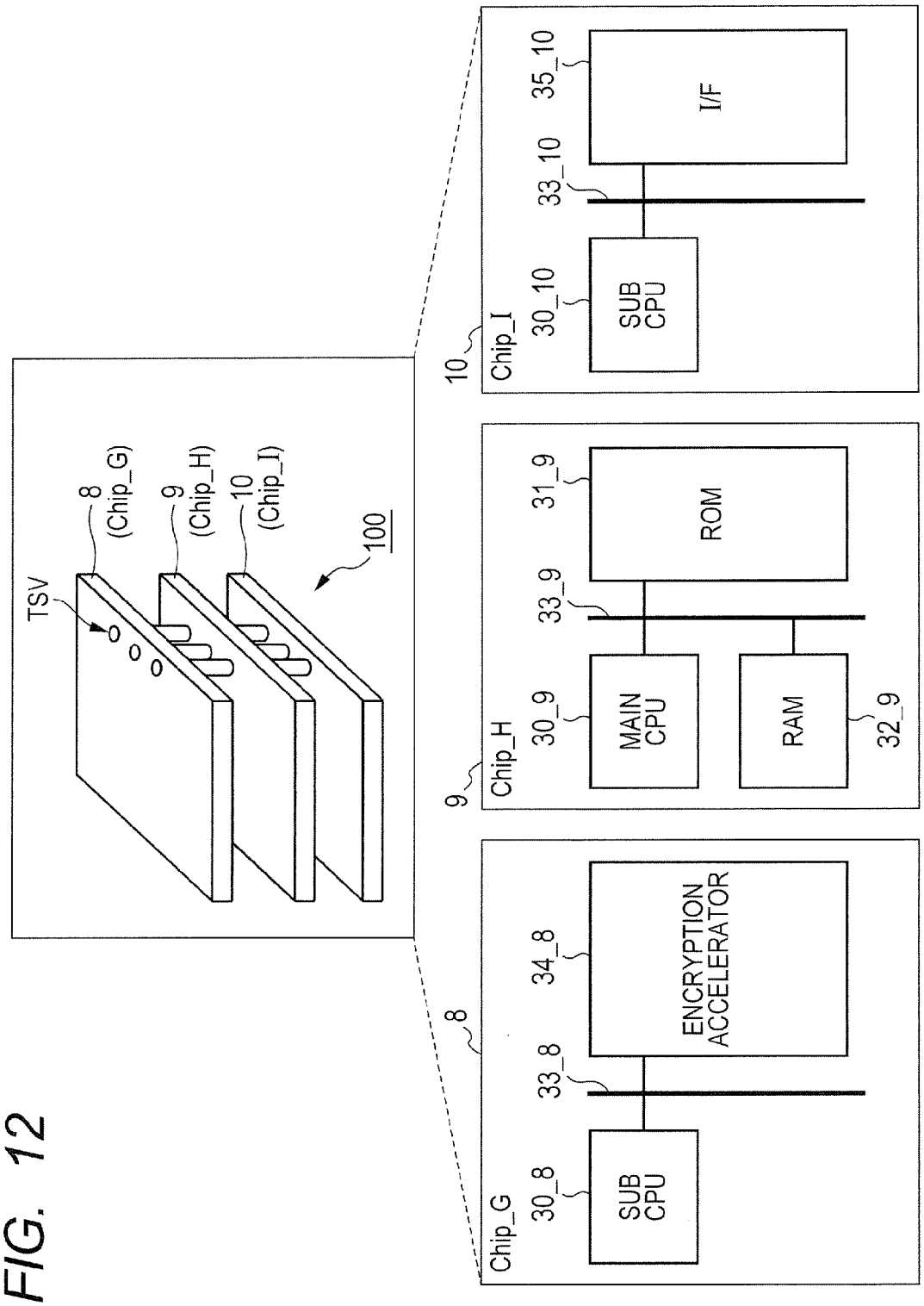
FIG. 12 is a schematic diagram showing a mounting example of a semiconductor device according to a fourth embodiment.

FIG. 12 is a schematic diagram showing a mounting example of a semiconductor device 100 according to a fourth embodiment. The semiconductor device 100 has a structure in which three layers of semiconductor chips (IC chips, Chip_G, Chip_H, and Chip_I) 8 to 10 are laminated or stacked. The Chip_I (10) is arranged at the lowest layer. The Chip_H (9) is laminated over the Chip_I (10), and further, the Chip_G (8) is laminated over the Chip_H (9). The Chip_I (10), the Chip_H (9), and the Chip_G (8) are coupled to each other by silicon substrate penetrating electrodes (TSVs) 20. Different from the semiconductor devices of the first to the third embodiments, the IC chips Chip_G (8), Chip_H (9), and Chip_I (10) includes a circuit configuration suitable to a function assigned to each IC chip. The IC chip Chip_G (8) in the uppermost layer includes a sub-CPU 30_8 and a ciphering accelerator 34_8 that are coupled through a bus 33_8. The IC chip Chip_H (9) in the intermediate layer includes a main CPU 30_9, a ROM 31_9, and a RAM 32_9 that are coupled to each other through a bus 33_9. The IC chip Chip_I (10) in the lowermost layer includes a sub-CPU 30_10 and an interface 35_10 that are coupled to each other through a bus 33_10. It is preferable that other functional blocks are mounted in the upper and lower layer chips as much as possible.

It is configured to cause the IC chip Chip_H (9) in the intermediate layer, which includes the main CPU 30_9, the ROM 31_9, and the RAM 32_9, to perform a cipher calculation where the highest tamper resistance is required, and other processing is assigned to the other IC chips Chip_G and Chip_I (8 and 10). Devices and data processing that do not require high security are arranged in the upper and lower layer IC chips Chip_G and Chip_I (8 and 10), so that it is difficult to physically access the IC chip Chip_H in the intermediate layer, which performs cipher processing that is targeted by an attacker. Therefore, it is possible to

Figure 13:
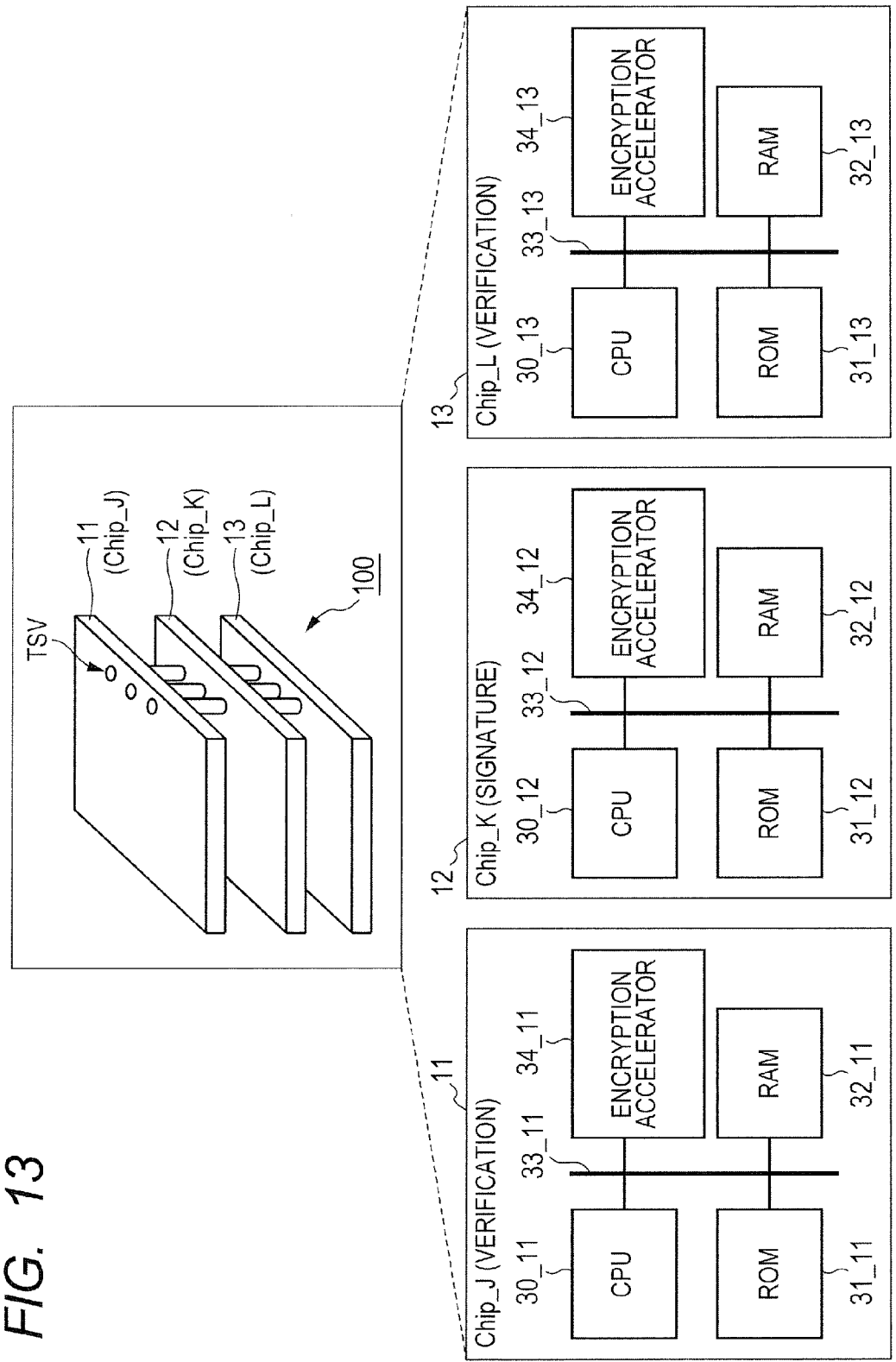
FIG. 13 is a schematic diagram showing a mounting example of a semiconductor device according to a fifth embodiment.

Fifth Embodiment: Chip Performing Signature Processing is Laminated in an Intermediate Layer FIG. 13 is a schematic diagram showing a mounting example of a semiconductor device 100 according to a fifth embodiment. The semiconductor device 100 has a structure in which three layers of semiconductor chips (IC chips, Chip_J, Chip_K, and Chip_L) 11 to 13 are laminated or stacked. The Chip_L (13) is arranged at the lowest layer. The Chip_K (12) is laminated over the Chip_L (13), and further, the Chip_J (11) is laminated over the Chip_K (12). The Chip_L (13), the Chip_K (12), and the Chip_J (11) are coupled to each other by silicon substrate penetrating electrodes (TSVs) 20. The IC chip Chip 11 includes a CPU 30_11, a ROM 31_11, a RAM 32_11, and a ciphering accelerator 34_11 that are coupled through a bus 33_11. The IC chip Chip 12 includes a CPU 30_12, a ROM 31_12, a RAM 32_12, and a ciphering accelerator 34_12 that are coupled through a bus 33_12. The IC chip Chip 13 includes a CPU 30_13, a ROM 31_13, a RAM 32_13, and a ciphering accelerator 34_13 that are coupled through a bus 33_13. The IC chips Chip 11 to Chip 13 may have the same function or may have a different function respectively.

When the semiconductor device 100 is formed by laminating three chips having the same function and different layouts, the configuration of the second embodiment can be applied, and when the semiconductor device 100 is formed by laminating three chips having the same function and the same layout, the configuration of the third embodiment can be applied.

In V2X (Vehicle to X; Vehicle to Infrastructure, Personal, etc.) which is an aspect in vehicle information communication, high-speed certificate verification is required. In general, certificate verification processing uses a public key, so that the degree of secrecy of information is low. Further, certificates are sent by broadcast from target vehicles and infrastructures located nearby, so that it is necessary to perform a huge number of validations. On the other hand, regarding processing of signature of certificate that is sent from the vehicle itself, although the certificate is sent at constant time intervals, the number of times of calculation is significantly smaller than that of verification. FIG. 13 shows a configuration in which the IC chips Chip_J (11) and Chip_L (13) which have a function of verification that is performed a large number of times are arranged in the upper stage and the lower stage respectively, and the IC chips Chip_K (12) which has a function to perform processing of signature is arranged in the intermediate stage (the intermediate layer). While an example of verification and signature in V2X is described, as an application example, it is possible to arrange IC chips having a function whose required security level is low into the upper and lower stages (the upper layer and the lower layer) and to arrange an IC chip having a function whose confidentiality is high into the intermediate stage (the intermediate layer).

Sixth Embodiment: Package Configuration

Figure 14:
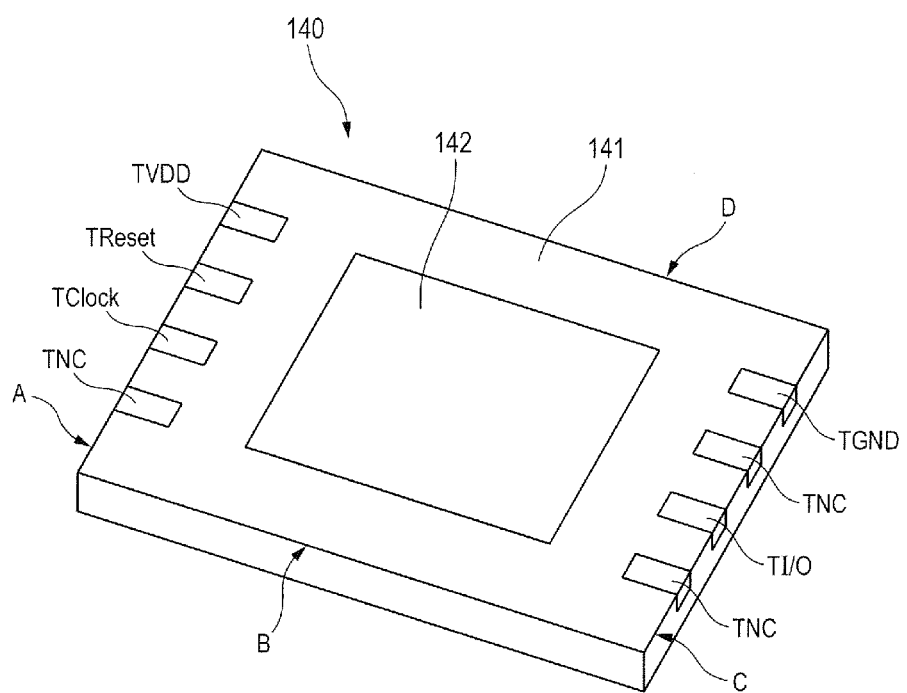
FIG. 14 is a perspective view of a semiconductor device 140 as seen from a bottom surface side (a mounting surface side).

FIG. 14 is a perspective view seen from the back side of a resin-sealed semiconductor device 140 including external coupling terminals (TVDD, TGND, TI/O, TClock, and TReset) which are formed of metal and electrically coupled to the electrode terminals (power supply (VDD), ground (GND), data input/output (I/O), clock (Clock), and reset (Reset)) respectively, which are shown by numbers 1 to 5 in FIGS. 8 to 11, and external coupling terminals (TNCs) which are not coupled to the electrode terminals (power supply (VDD), ground (GND), data input/output (I/O), clock (Clock), and reset (Reset)).

The semiconductor device 140 is a P-VQFN (Plastic Very fine Quad Flat Non-leaded package) type semiconductor device. For example, the semiconductor device 140 is formed as a rectangular package (sealed portion) 141 having four sides (first side A, second side B, third side C, and fourth side D) by sealing the three semiconductor chips 1 to 3 shown in FIGS. 1, 6, 7, and 12, a chip mounting unit (tab) on which the semiconductor chips are mounted, inner leads (external coupling terminals (TVDD, TGND, TI/O, TClock, TReset, and TNCs), and metal wirings (bonding wires) formed of gold wires, copper wires, or the like by a thermosetting sealing resin by using mold formation performed by a molding device.

Although not being limited in particular, a metal plate 142 formed of aluminum or the like may be provided on the back surface of the semiconductor device 140 in order to improve the tamper resistance.

On two sides (the first side A and the third side C) of the package 141, a plurality of external coupling terminals (TVDD, TGND, TI/O, TClock, TReset, and TNCs) are provided and formed to be exposed from the mounting surface to a side surface of the package 141. On surfaces of a plurality of external coupling terminals (TVDD, TGND, TI/O, TClock, TReset, and TNCs), for example, solder plating such as electrolytic plating is applied. When the semiconductor device 140 is mounted on a printed wiring board, the external coupling terminals (TVDD, TGND, TI/O, TClock, TReset, and TNCs) are electrically coupled to land electrodes, respectively, which are coupling electrodes formed on the printed wiring board.

Although a detailed diagram is not shown because it is well known to those skilled in the art, the electrode terminals (power supply (VDD), ground (GND), data input/output (I/O), clock (Clock), and reset (Reset)) which are shown by numbers 1 to 5 in FIGS. 8 to 11 are electrically coupled to coupling electrode pads of power supply (VDD), ground (GND), data input/output (I/O), clock (Clock), and reset (Reset), respectively, which are, for example, provided over the chip (Chip_A). These electrical couplings are performed by, for example, a multilayer wiring structure formed from a plurality of metal wiring layers formed over the chip 1 (Chip_A) and a plurality of interlayer insulating layers formed between the metal wiring layers.

While the invention made by the inventors has been specifically described based on the embodiments, the invention is not limited to the embodiments, but needless to say that the invention may be modified in various ways without departing from the scope of the invention.

For example, although an example in which each chip including a CPU, a ROM, and a RAM performs a cipher calculation has been mainly described, this may be replaced by a hardware ciphering accelerator.

What is claimed is:

1. A semiconductor device in which a plurality of IC chips are laminated and which can perform data processing including cipher calculation,
   wherein the IC chips perform a same cipher calculation in parallel and each IC chip calculates a calculation result, and
   wherein an element surface of one IC chip of the IC chips is covered by another IC chip, and the one IC chip compares a plurality of calculation results corresponding to the IC chips with each other and controls content of subsequent data processing based on results of the comparison.

2. The semiconductor device according to claim 1,
wherein the one IC chip is laminated so that a surface opposite to the element surface is further covered by another IC chip.

3. The semiconductor device according to claim 2,
wherein when at least one of the calculation results is different from the other calculation results, the one IC chip starts processing corresponding to an attack.

4. The semiconductor device according to claim 2,
wherein when at least one calculation result of the calculation results is different from the other calculation results, the one IC chip causes an IC chip that outputs the different calculation result to perform recalculation of the cipher calculation,
wherein when a recalculation result is the same as the original calculation result, the one IC chip starts processing corresponding to a failure, and
wherein when the recalculation result is different from the original calculation result, the one IC chip starts processing corresponding to an attack.

5. The semiconductor device according to claim 2,
wherein when a calculation result of the one IC chip is different from the other calculation results, the one IC chip performs recalculation of the cipher calculation,
wherein when a recalculation result is the same as the original calculation result, the one IC chip starts processing corresponding to a failure,
wherein when the recalculation result is different from the original calculation result, the one IC chip starts processing corresponding to an attack, and
wherein among the calculation results, when a calculation result of at least one of the IC chips other than the one IC chip is different from the other calculation results, the one IC chip starts processing corresponding to an attack.

6. The semiconductor device according to claim 1,
wherein the IC chips have the same circuit configuration and an arrangement of a circuit that performs the cipher calculation is laid out at positions different from each other in plan view.

7. The semiconductor device according to claim 1,
wherein the IC chips have the same layout and are laminated in a state in which the IC chips are rotated by ±90° or 180° from each other, and/or element surfaces or substrate surfaces thereof face each other.

8. The semiconductor device according to claim 7,
wherein each of the IC chips has a plurality of terminals having functions respectively, and a terminal having the same function is arranged at least one position of a position rotated by ±90 ° or 180° around the same point and a symmetrical position with respect to a straight line in parallel with a side of the IC chip.

9. The semiconductor device according to claim 8,
wherein the terminals include a plurality of power supply terminals, a plurality of ground terminals, one or a plurality of data input/output terminals, one or a plurality of clock terminals, and one or a plurality of reset terminals.

10. The semiconductor device according to claim 1,
wherein each of the IC chips has an electrode penetrating through the substrate, and the electrodes are electrically coupled to each other.

11. A semiconductor device in which three IC chips, each of which has a TSV electrode penetrating through a substrate, are laminated,
wherein a second IC chip is laminated over a first IC chip with their TSV electrodes being coupled to each other and a third IC chip is laminated over the second IC chip with their TSV electrodes being coupled to each other, and
wherein each of the first, the second, and the third IC chips performs the same data processing and calculates a processing result of each IC chip, and the second IC chip compares processing results corresponding to the first, the second, and the third IC chips with each other, and controls content of subsequent data processing based on a result of the comparison.

12. The semiconductor device according to claim 11,
wherein at least two of the first, the second, and the third IC chips perform the aforementioned same data processing in parallel at a time.

13. The semiconductor device according to claim 12,
wherein the data processing is a part of a series of rounds where cipher processing is configured.

14. The semiconductor device according to claim 11,
wherein when the data processing is cipher processing, each of the first, the second, and the third IC chips performs the same cipher processing and calculates a processing result of each IC chip, and the second IC chip compares the processing results corresponding to the first, the second, and the third IC chips with each other, and
wherein when the data processing is other than cipher processing, the first, the second, and the third IC chips divide the data processing into different data processing portions and perform them in parallel.

15. A semiconductor device in which a plurality of IC chips are laminated and which can perform data processing including cipher calculation,
wherein among the IC chips, one IC chip in an intermediate layer, whose element surface is covered by another IC chip, is caused to perform processing that requires the highest tamper resistance in processing included in the data processing.

16. The semiconductor device according to claim 15,
wherein the IC chips perform the same cipher calculation in parallel and calculate calculation results respectively, and the IC chip in the intermediate layer compares the calculation results corresponding to the IC chips with each other, and controls content of subsequent data processing based on a result of the comparison.

17. The semiconductor device according to claim 15,
wherein the data processing includes the cipher calculation, the IC chip in the intermediate layer is caused to perform the cipher calculation, and the other IC chips are caused to perform other processing.

18. The semiconductor device according to claim 15,
wherein the data processing includes signature processing and certificate verification processing as the cipher calculation, the IC chip in the intermediate layer is caused to perform the signature processing, and the other IC chips are caused to perform other processing including the certificate verification processing.

19. The semiconductor device according to claim 15,
wherein a surface opposite to the element surface of the IC chip in the intermediate layer is further laminated with another IC chip so that the surface is covered by the other IC chip.

* * * * *